(12) United States Patent
Kourounis et al.

(10) Patent No.: US 11,080,362 B2
(45) Date of Patent: Aug. 3, 2021

(54) METHOD TO ACCELERATE THE PROCESSING OF MULTIPERIOD OPTIMAL POWER FLOW PROBLEMS

(71) Applicant: Università della Svizzera italiana, Lugano (CH)

(72) Inventors: Drosos Kourounis, Villa Luganese (CH); Olaf Schenk, Lugano (CH)

(73) Assignee: UNIVERSITÀ DELLA SVIZZERA ITALIANA, Lugano (CH)

( * ) Notice: Subject to any disclaimer, the term of this patent is extended or adjusted under 35 U.S.C. 154(b) by 116 days.

(21) Appl. No.: 16/498,676

(22) PCT Filed: Mar. 30, 2017

(86) PCT No.: PCT/EP2017/057632
§ 371 (c)(1),
(2) Date: Sep. 27, 2019

(87) PCT Pub. No.: WO2018/177529
PCT Pub. Date: Oct. 4, 2018

(65) Prior Publication Data
US 2020/0042569 A1 Feb. 6, 2020

(51) Int. Cl.
*G06F 17/11* (2006.01)
*H02J 3/06* (2006.01)

(52) U.S. Cl.
CPC .............. *G06F 17/11* (2013.01); *H02J 3/06* (2013.01); *H02J 2203/20* (2020.01)

(58) Field of Classification Search
CPC ......... G06F 17/11; H02J 3/06; H02J 2203/20; Y02E 60/00; Y02E 40/70; Y04S 10/50; Y04S 40/20

(Continued)

(56) References Cited

U.S. PATENT DOCUMENTS 8,756,556 B1 * 6/2014 Raghunathan .......... G06F 17/11
716/133
9,176,171 B2 * 11/2015 Bickel ................. H02J 13/0006
(Continued)

FOREIGN PATENT DOCUMENTS

EP       2773005       9/2014

OTHER PUBLICATIONS

Kourounis et al., "Efficient solution of large scale multi-stage optimal power flow problems using interior point methods", ECCOMAS Congress Jun. 2016, Greece, Abstract, https://eccomas2016.org/proceedings/pdf/8168.pdf.
(Continued)

*Primary Examiner* — Fernando Hidalgo
(74) *Attorney, Agent, or Firm* — Saliwanchik, Lloyd & Eisenschenk

(57) ABSTRACT

A method is disclosed for optimizing the power flow in an electric power network including a plurality of buses interconnected by transmission lines, and locally connected to loads, generators, and storage devices, the method executing an interior point optimisation algorithm in a computer system to solve an optimal control problem, which is defined over a time period of interest T, and is associated with an objective function representing the total fuel consumption of the generators for the time period of interest T, wherein the objective function depends on a plurality of parameters of the network, such as bus voltages, generator, and storage device powers. the parameters of the network allowed to vary over a large number N of predefined time intervals, each of duration δt, obtained by subdivisions of the time period of interest T and is subject to network constraints. The time and memory required to achieve the solution to the optimal control problem is drastically reduced over general purpose NLP methods, due to exploitation in the calcula- (Continued)

tions involved in the Schur complement algorithm of the repetition of constant in time block matrices of charging and discharging ratios of the storage devices inside off diagonal blocks in a reorder KKT system.

20 Claims, 14 Drawing Sheets

(58) Field of Classification Search
USPC .......................................................... 700/33
See application file for complete search history.

(56) References Cited

U.S. PATENT DOCUMENTS

| 10,296,988 B2* | 5/2019 | Mitra .................... G06Q 50/06 |
| 10,390,307 B2* | 8/2019 | Mendil ................. H04M 19/08 |
| 10,424,935 B2* | 9/2019 | Varma .................... H02J 3/385 |
| 10,591,945 B2* | 3/2020 | Ditlow ...................... G05F 1/66 |
| 10,892,640 B2* | 1/2021 | Kuroda ................... H02J 13/00 |
| 2015/0199606 A1* | 7/2015 | Raghunathan ........... G06N 5/04 706/53 |

OTHER PUBLICATIONS

ECCOMAS Congress 2016 VII European Congress on Computational Methods in Applied Sciences and Engineering, Jun. 2016, Greece, Programme, European Community on Computational Methods in Applied Sciences.

Ochoa et al., "Minimizing Energy Losses: Optimal Accommodation and Smart Operation of Renewable Distributed Generation", IEEE Transactions on Power Systems, vol. 26, No. 1, Feb. 2011, pp. 198-205.

Gopalakrishnan et al., "Global Optimization of Multi-period Optimal Power Flow", 2013 American Control Conference (ACC), Washington, DC, USA, Jun. 17-19, 2013, pp. 1157-1164.

Wang et al., "A Multi-Period Optimal Power Flow Model including Battery Energy Storage", 2013 IEEE Power & Energy Society General Meeting, 2013, pp. 1-5.

International Search Report and Written Opinion, PCT International Application No. PCT/EP2017/057632, PCT/ISA/210, PCT/ISA/220, PCT/ISA/237, dated Jan. 16, 2018.

* cited by examiner

METHOD TO ACCELERATE THE PROCESSING OF MULTIPERIOD OPTIMAL POWER FLOW PROBLEMS

CROSS-REFERENCE TO RELATED APPLICATION

This application is a national stage application of International Application No. PCT/EP2017/057632, filed Mar. 30, 2017, which is incorporated herein by reference in its entirety, including any figures, tables, and drawings.

FIELD OF APPLICATION

The present invention relates generally to electric power networks. More specifically, it concerns the power flow optimization of electric power networks that involve energy storage devices.

PRIOR ART

A method for optimizing electric power flows in a power network, more particularly in a power grid having alternating current (AC) circuits, is addressed to determine bus voltages and generator power levels in order to minimise power generation costs or other costs (market related) or transmission losses. The minimization of the costs is subject to power flow engineering and operational constraints that can include the AC power flow constraints, bounds on power generation, bounds on bus voltage magnitudes, bounds on thermal losses, and limits on power transfer on transmission lines. Bus voltages and generator power levels are determined as a solution of an Optimal Power Flow (OPF) problem. In this respect, several methods known to solve the OPF problem are briefly commented on below.

Conventional power flow optimization methods assume small differences between phase angles at buses, to reduce quadratic equalities and inequalities to linear equalities and inequalities. However, these methods cannot be applied to all networks and they lead to suboptimal solutions.

Other methods such as second-order cone programming (SOCP) employ convex relaxations of OPF problems. However, relaxed convex optimizations methods cannot guarantee feasible solutions.

Further known methods relax OPF problems to semidefinite programming (SDP), which requires changing resistances of lossless lines in the network, restrictions on the network topology or constraints, or require modification of the network to ensure global optimality.

These methods are affected by the following drawbacks. They do not consider that the amount of energy that is stored, charged, or discharged in batteries at any time is critically dependent on the amount that is actually charged or discharged from the batteries at that time.

They ignore time dependent changes for equipment, and use devices such as step voltage regulators, voltage transformers, or capacitor banks. These devices are typically expensive and frequent changes in their operations can lead to quick degradation of the equipment and eventually result in dramatic reduction in the life of the device.

Modern real-time operations require the AC-OPF problem to be solved weekly in 8 hours, daily in 2 hours, hourly in 15 minutes, each five minutes in 1 minute and for self-healing post-contingency in 30 seconds (Mary B Cain, Richard P O'neill, and Anya Castillo. History of optimal power flow and formulations. *Federal Energy Regulatory Commission*, pages 1-36, 2012). To meet these constraints, system operators have to adopt varying levels of approximations such as, simplified OPF tools based on linear programming (LP) and de-coupled (DC) system models. As a result today's approximate solution techniques may unnecessarily cost tens of billions of dollars per year, and result to environmental harm from unnecessary emissions and wasted energy.

General nonlinear programming (NLP) methods have also been employed for the solution of OPF problems. These methods are adapted to properly optimise the electric power flow taking into account all the nonlinearities, and a plurality of time periods necessitated by time-varying parameters of power network equipment. These methods do not adopt any approximations or simplifications that would result in unnecessarily higher cost of energy, wasted energy and environmental harm.

Despite their robustness however, NLP methods have not been widely adopted in real-time operations of large-scale power systems. This is due to the fact that the multiperiod optimal power flow (MPOPF) problem a system operator seeks a solution to, is time-coupled due to power network equipment such as energy storage devices, an example of which are batteries. Its complexity increases quickly with an increasing number of the time periods, over which power network equipment parameters are set to vary with time, to the point of intractability. As a result NLP methods require high computational times and large amounts of computer memory in order to solve the MPOPF problem. In other words, the NLP methods currently known are not suitable for real-time operations and cannot be adopted by the industry for controlling the power network. Historically, this is mainly due to the lack of time and memory efficient AC-OPF algorithms.

SUMMARY OF THE INVENTION

The idea at the base of the present invention is to provide a method that can take advantage of the particular structure and properties of the MPOPF problem, in order to reduce the solution time and memory consumption to the minimum even for very large values of the number of time periods of operation of the power grid.

The disclosed invention describes a system and a method for operating an electric power system that determines optimal bus voltages and phases angles as well as optimal generator active and reactive powers, such that an objective function representing the cost of power generation or other cpsts (market related), or transmission losses is either minimised or maximised. This is achieved by an interior point structure-exploiting optimization method that is tailored to deliver unprecedented performance and reduce the memory consumption to minimum.

The present invention accomplishes the foregoing objectives by providing a structure-exploiting optimization method that provides the capability of optimal power flow over multiple time periods of operation to complex power systems. A power system or network in this sense refers to an electrical power system or an electrical network that includes energy storage devices.

More specifically, power flow in an electric power network is optimised during multiple time periods of operation by solving an optimal control problem using an interior point method designed to exploit the structure and the properties of the optimal control problem for an electrical power system with energy storage devices, in order to deliver significant reduction of the computing time and the memory consumption.

More specifically, the embodiments of the invention provide a sparse structure-exploiting KKT system Schur factorization and solution method that is adapted to the modeling of the power system components.

Additionally, a structure exploiting low memory Schur complement dense $LDL^T$ solver is also provided that achieves optimal time and memory factorization and solution of the dense Schur complement system, required by the structure-exploiting sparse KKT factorization and solution methods.

To accommodate very large problems arising for a sufficiently large number of time periods of operation, the invention also provides an alternative structure-exploiting algorithm that keeps the memory requirements approximately comparable to the memory consumption if a single time period of operation is assumed. This way both objectives of computational time and memory reduction are achieved.

On the basis of the idea mentioned above, the technical problem is solved by a method for optimizing the power flow in an electric power network, the electric power network including a plurality of buses interconnected by transmission lines, and locally connected to loads, generators and storage devices;
the method executes an interior point optimization algorithm in a computer system to solve an optimal control problem defined over a time period of interest T, where an objective function associated with the optimal control problem represents a total fuel consumption of the generators for said time period of interest T,
the objective function depending on a plurality of parameters of the network, bus voltages, generator, and storage devices powers, the parameters of the network allowed to vary over a number N of predefined time intervals each of duration $\delta t$ obtained by subdivisions of said time period of interest T, wherein said objective function is subject to engineering constraints imposed by the safe and robust functionality of the devices of said network, such as limits on bus voltages, limits on generator and storage devices powers, and thermal power flow limits on the transmission lines, characterized by the fact that said interior point optimization algorithm includes the steps of:

storing a KKT system associated with the optimality conditions for the Lagrangian associated with the objective function and the constraints defined for the time period T, the KKT system including a Hessian matrix H;

reordering the KKT system to obtain a reordered KKT system where the Hessian matrix H after the reordering has an arrowhead structure with diagonal blocks $A_n$, and off diagonal blocks $B_n$ comprising several identical copies of constant in time matrix B of charging and discharging ratios of the storages devices;

executing a direct Schur complement based factorization and solution algorithm on the reordered KKT system;

returning output parameters for the network devices, namely, buses, loads, generators, and storages devices as a solution of the optimal control problem for each of the time intervals.

Advantageously, the time and memory required to achieve the solution to the optimal control problem are drastically reduced over general purpose NLP methods, due to exploitation, in the calculations involved in the Schur complement algorithm, of the repetition of constant in time block matrices B of charging and discharging ratios of the storage devices inside the off diagonal blocks $B_n$ in the reorder KKT system.

In the following description, the expressions "time interval" and "time periods" are used as synonyms.

The dependent claims disclose further features of the method and system according to the present invention, and the effects and advantages thereof are given here below, together with a detailed explanation of how the method is embodied.

BRIEF DESCRIPTION OF THE DRAWINGS

For a more complete understanding of the invention, reference is made to the following description and accompanying drawings, in which.

DETAILED DESCRIPTION

The Network

Hereafter a method for optimizing the power flow in an electric power network according to the present invention is described in more detail.

The electric power network includes a plurality of buses interconnected by transmission lines, and locally connected to loads, generators, and storage devices. More particularly, the power network may consist of $N_B$ buses, locally connected to loads that consume power, and $N_G$ generators supplying active and reactive power to the network. The buses are interconnected by $N_L$ transmission lines. $N_S$ storage devices, an example of which are batteries, are also installed at a subset of the buses of the network. The network topology is represented (associated) by a directed graph $\mathcal{G}$ ($\mathcal{B},\mathcal{L}$), where $\mathcal{B}$ stands for the nodes of the graph, representing the $N_B$ buses, whereas $\mathcal{L}$ stands for the directed edges of the grid that represent the $N_L$ transmission lines. It is evident that $|\mathcal{B}|=N_B$ and $|\mathcal{L}|=2N_L$. Finally let $\mathcal{G}$ denote the set of generators.

Sample electric power networks schematics used by the embodiments of the present invention are provided in FIG. 1, FIG. 2, FIG. 3, and FIG. 4, for the power grids of cases IEEE30, IEEE118, PEGASE1354, and PEGASE13659 correspondingly. The numbered circles denote the buses of the grid, and the transmission lines are represented with line segments connecting the circles representing the buses. The arrows attached on the circles directed downwards, represent loads locally connected to the buses. Smaller circles enclosing a tilde or the letter 'c' represent the generators connected to the buses.

Figure 1:
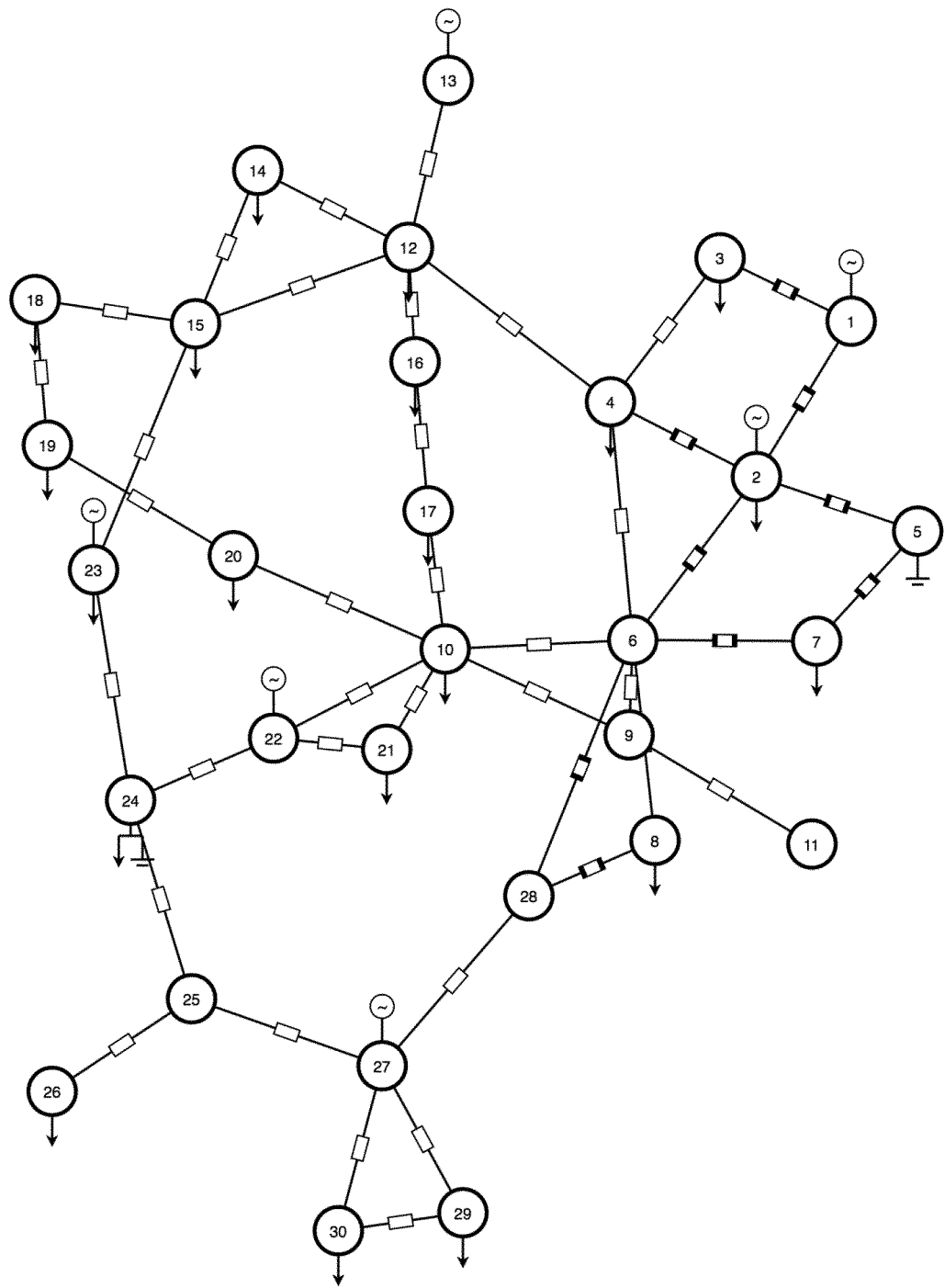
FIG. 1 is a schematic of the power network of the benchmark case IEEE30 used by the embodiments of the present invention.
Figure 2:
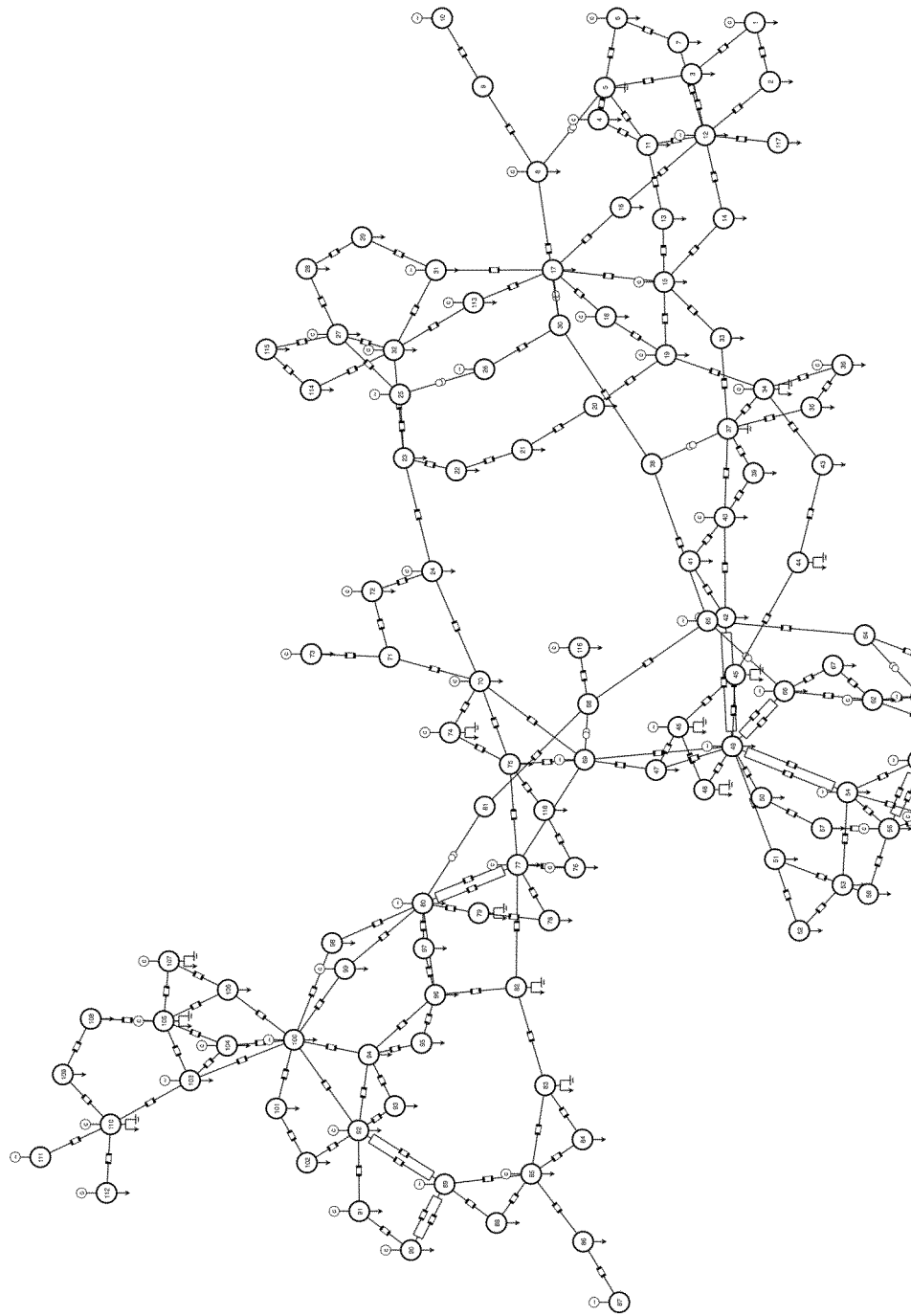
FIG. 2 is a schematic of the power network of the benchmark case IEEE118 used by the embodiments of the present invention.
Figure 3:
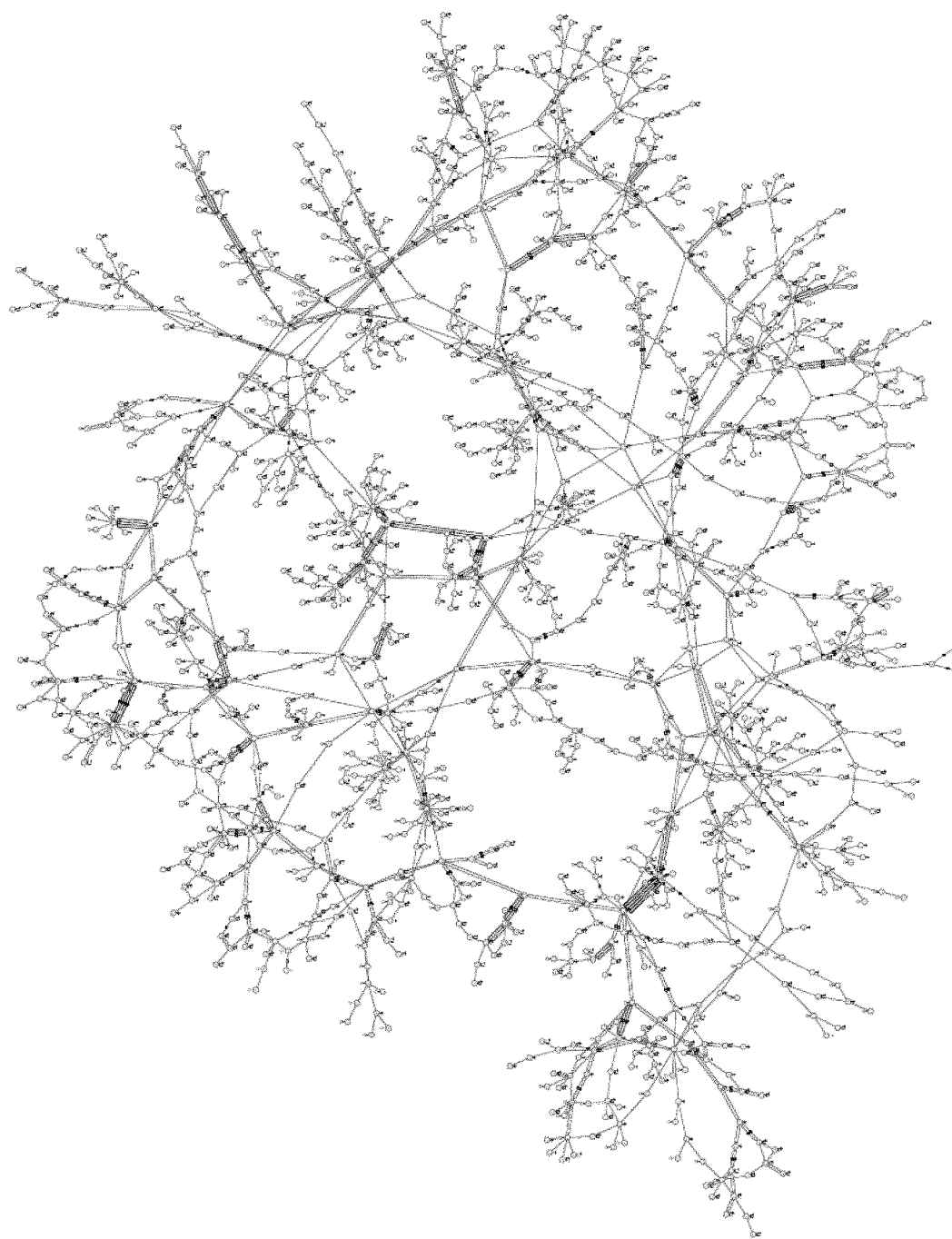
FIG. 3 is a schematic of the power network of the benchmark case PEGASE1354 used by the embodiments of the present invention.
Figure 4:
FIG. 4 is a schematic of the power network of the benchmark case PEGASE13659 used by the embodiments of the present invention.

Although the circle numbers, segments, arrows, tildes and other symbols in FIG. 2, FIG. 3, and FIG. 4, are not readable, and are even less comprehensible in FIG. 3, and FIG. 4, the scope of these figures is not to precisely identify buses, transmission lines, and their connections to generators or loads, but instead to give an idea on the increasingly higher complexity of the networks that can be processed by the method of the present invention.

The MPOPF Problem

In general the OPF problem optimises the operation of an electric power system, specifically, the generation and transmission of electricity, subject to the physical constraints imposed by electrical laws, network operations, and engineering limits on the decision variables. The objective is to minimise generation cost, maximise market surplus, or minimise active transmission loses.

Modern trends for large-scale integration of renewable energy sources, however, bring additional challenges to power grid operations and modeling. Distributed energy storage devices are commonly employed as an effective approach for addressing operational challenges. However, the modeling of storage devices results in intertemporal coupling of the individual OPF problems defined at each subdivision of the time period of interest. The resulting MPOPF problem becomes intractable, for prior art methods, prohibiting using these methods for forecasting and planning over long time periods or even small time periods subdivided into a large number of smaller time intervals to allow for exploitation of more precise data about the network. According to the method of the present invention, as will be apparent from the following description, such an MPOPF problem may be solved in a time effective way. The following input parameters to the MPOPF may be taken into consideration.

Input to the MPOPF Problem

Input parameters to the optimal control method MPFOPT are the following.

1. $\mathcal{G}$ ($\mathcal{B},\mathcal{L}$), $N_G$, $N_L$, $N_S$: The graph, the number of generators, the number of transmission lines, and the number of storage devices.

2. $I_G$, $I_S$: The locations of generators, and the locations of storage devices.

3. $\alpha_l$, $\beta_l$, $\gamma_l$: The conductance and the susceptance of the line, as well as the shunt capacitance $\gamma_l$ of the line for $l \in \mathcal{L}$.

4. $d_b^P$, $d_b^Q$: Active and reactive power demand at bus $b \in \mathcal{B}$.

5. $f_l^{max}$: Thermal flow limit for every line $l \in \mathcal{L}$.

6. $V_b^{max}$, $V_b^{min}$: Maximum and minimum voltage level for each bus $b \in \mathcal{B}$.

7. $p_g^{max}$, $p_g^{min}$: Maximum and minimum active power levels for each generator $g \in \mathcal{G}$.

8. $q_g^{max}$, $q_g^{min}$: Maximum and minimum reactive power levels for each generator $g \in \mathcal{G}$.

9. $\tau_t^{max}$, $\tau_t^{min}$: Maximum and minimum tap ratio limits for transformer $t \in \mathcal{T}$.

10. $a_g$, $b_g$, $c_g$: Constant, linear, and quadratic term of the power generation cost function for generator $g \in \mathcal{G}$.

11. $\eta_{c,s}$, $\eta_{s,d}$: Charging and discharging ratios for each storage device $s \in S$.

Objectives

One of the most frequent objectives of the MPOPF problem is to minimise generation cost. Assuming $g \in G$ and $a_g$, $b_g$, $c_g$ are cost related coefficients for each generation unit, the generation cost is usually approximated as a quadratic function of the associated powers of each unit:

$$f(p_n^g) = \sum_{n=1}^{N} \sum_{g=1}^{N_G} a_g (p_n^g)^2 + b_g p_n^g + c_g, \qquad (1)$$

although any nonlinear form could be used other than the quadratic. Other nonlinear functions are also not excluded representing either market surplus or active transmission loses.

Constraints of the MPOPF Problem

At every time period n=1, 2, . . . , N the MPOPF problem is subject to linear and nonlinear equality and inequality constraints. For clarity and simplicity, the time dependence indicated by the subscript n from every variable is introduced only later in the description, to emphasize the intertemporal time coupling introduced by the linear inequality constraints related to the energy levels of the storage devices.

Let $\mathcal{L}_i$ stand for the set of buses connected through a transmission line to the ith bus. Let l be a transmission line from bus i to bus j, l=(i,j), and $\theta_{ij}=\theta_i-\theta_j$. The MPOPF constraints are the following:

1. Reference bus $b_0$:

$$\theta_{b_0}=0. \qquad (2)$$

2. Equality constraints: Kirchhoff's current law $$\sum_{g|I_g=b} p_g - d_b^P = \sum_{l \in \mathcal{L}_i} f_l^P, \forall b \in \mathcal{B}, \quad (3)$$

$$\sum_{g|I_g=b} q_g - d_b^Q = \sum_{l \in \mathcal{L}_i} f_l^Q - \frac{1}{2} V_b^2 \sum_{l \in \mathcal{L}_i} \gamma_l, \forall b \in \mathcal{B}, \quad (4)$$

$$f_l^P = \begin{cases} \alpha_l V_i^2 - V_i V_j (\alpha_l \cos(\theta_{ij}) + \beta_l \sin(\theta_{ij})), & l \in \mathcal{L}, \\ \alpha_l \frac{V_i^2}{\mathcal{T}_t^2} - \frac{V_i V_j}{\mathcal{T}_t} (\alpha_t \cos(\theta_{ij}) + \beta_t \sin(\theta_{ij})), & l \in \mathcal{T}, \text{ bus } i \text{ tapped}, \\ \alpha_l V_i^2 - \frac{V_i V_j}{\mathcal{T}_t} (\alpha_t \cos(\theta_{ij}) + \beta_t \sin(\theta_{ij})), & l \in \mathcal{T}, \text{ bus } j \text{ tapped}, \end{cases} \quad (5)$$

$$f_l^Q = \begin{cases} -\beta_l V_i^2 - V_i V_j (\alpha_l \sin(\theta_{ij}) - \beta_l \cos(\theta_{ij})), & l \in \mathcal{L}, \\ -\beta_l \frac{V_i^2}{\mathcal{T}_t^2} - \frac{V_i V_j}{\mathcal{T}_t} (\alpha_t \sin(\theta_{ij}) - \beta_t \cos(\theta_{ij})), & l \in \mathcal{T}, \text{ bus } i \text{ tapped}, \\ -\beta_l V_i^2 - \frac{V_i V_j}{\mathcal{T}_t} (\alpha_t \sin(\theta_{ij}) - \beta_t \cos(\theta_{ij})), & l \in \mathcal{T}, \text{ bus } j \text{ tapped}. \end{cases} \quad (6)$$

3. Nonlinear inequality constraints: thermal line flow $$(f_{l,n}^P)^2 + (f_l^Q)^2 \le (f_l^{max})^2 \; \forall l \in \mathcal{L}. \quad (7)$$

4. Box constraints: active and reactive power $$p_g^{min} \le p_g \le p_g^{max} \; \forall g \in \mathcal{G}, \quad (8)$$

$$q_g^{min} \le q_g \le q_g^{max} \; \forall g \in \mathcal{G}, \quad (9)$$

5. Box constraints: voltage levels and angles $$\theta_b^{min} \le \theta_b \le \theta_b^{max} \; \forall b \in \mathcal{B}, \quad (10)$$

$$V_b^{min} \le V_b \le V_b^{max} \; \forall b \in \mathcal{B}, \quad (11)$$

6. Linear inequality constraints: energy level of storages

The energy level of the storage devices $\epsilon_n$ at the nth time period, is computed from $\epsilon_{n-1}$ through the formula $$\epsilon_n = \epsilon_{n-1} + B p_{n-1}^S, n=1,2,\ldots,N, \quad (12)$$

where $p_n^S = [(p_n^{Sd})^T \; (p_n^{Sc})^T]^T \in \mathbb{R}^{2N_S}$ is the vector of active storage power injection at the nth time period and the matrix $B \in \mathbb{R}^{N_S \times 2N_S}$ is $$B = \delta t \begin{bmatrix} -\eta_{d,1}^{-1} & & & \eta_{c,1}^{-1} & & \\ & \ddots & & & \ddots & \\ & & -\eta_{d,N_S}^{-1} & & & \eta_{c,N_S}^{-1} \end{bmatrix} \quad (13)$$

with $\eta_{d,i}$ and $\eta_{c,i}$, $i=1, \ldots, N_S$ being the discharging and charging efficiencies. The vector of storage levels has to be bounded at each time period n, $$\epsilon^{min} \le \epsilon_n \le \epsilon^{max}. \quad (14)$$

Additionally, the storage level at the end of the dispatch horizon N may be required to match its initial value in order to prevent depletion of the storage:

$$\epsilon_N = \epsilon_0. \quad (15)$$

Both constraints are linear and they can be jointly written as $$\underbrace{\begin{bmatrix} \epsilon^{min} \\ \epsilon^{min} \\ \vdots \\ \epsilon^{min} \\ \epsilon_0 \end{bmatrix}}_{\epsilon^{S,min}} \le \underbrace{\begin{bmatrix} \epsilon_0 \\ \epsilon_0 \\ \vdots \\ \epsilon_0 \\ \epsilon_0 \end{bmatrix}}_{E^0} + \underbrace{\begin{bmatrix} B & 0 & \cdots & 0 \\ B & B & \cdots & 0 \\ \vdots & \vdots & \ddots & \vdots \\ B & B & \cdots & B \\ B & B & \cdots & B \end{bmatrix}}_{E^S} \underbrace{\begin{bmatrix} p_1^S \\ p_2^S \\ \vdots \\ p_N^S \end{bmatrix}}_{p^S} \le \underbrace{\begin{bmatrix} \epsilon^{max} \\ \epsilon^{max} \\ \vdots \\ \epsilon^{max} \\ \epsilon_0 \end{bmatrix}}_{\epsilon^{S,max}}, \quad (16)$$

where the equality constraint has been written as an inequality constraint with equal upper and lower bounds.

The MPOPF Problem

The resulting optimization problem is a general nonlinear optimization problem:

$$\underset{\theta,v,p,q}{\text{minimize}} \sum_{n=1}^{N} \sum_{l=1}^{N_G} a_l (P_n^l)^2 + b_l P_n^l + c_l \quad (MPOPF) \quad (16)$$

subject to (2), (3), (4), (7), (8), (9), (10), (11)

$$\forall n = 1, 2, \ldots, N.$$

Each one of the control parameter vectors $\{\theta, v, p, q\}$ stands for the variables from the time periods $n=1, \ldots, N$. The angles are ordered as $\theta = [\theta_1^T, \ldots, \theta_N^T]^T$. The voltages, the active, and the reactive powers are ordered similarly. The N OPF problems could be solved independently from each other if it was not for storage inequality constraints (16) that couple storage powers from all time steps. For this reason the N OPF problems have to be solved coupled with the storage inequality constraints. The resulting (MPOPF) problem can be solved using any general purpose NLP solver like IPOPT (Andreas Wächter and Lorenz T. Biegler. Line search filter methods for nonlinear programming: motivation and global convergence. *SIAM J. Optim.*, 16(1):1-31 (electronic), 2005), (Andreas Wächter and Lorenz T. Biegler. On the implementation of an interior-point filter line-search algorithm for large-scale nonlinear programming. *Math. Program.*, 106(1, Ser. A):25-57, 2006), MIPS (H. Wang, C. E. Murillo-Sanchez, R. D. Zimmerman, and R. J. Thomas. On computational issues of market-based optimal power flow. *IEEE Transactions on Power Systems*, 22(3):1185-1193, August 2007), or KNITRO (Richard H. Byrd, Jorge Nocedal, and Richard A. Waltz. *Knitro: An Integrated Package for Nonlinear Optimization*, pages 35-59. Springer U S, Boston, Mass., 2006. ISBN 978-0-387-30065-8). The computational complexity grows quickly for longer dispatch horizons N. However, according to the method of the present invention as specifically disclosed below, a particularly efficient solution is found due to the special structure of the time coupling storage constraints defined by $E^S$.

Interior Point Methods

The present invention proposes an efficient IP algorithm, MPFOPT, particularly designed for MPOPF problems. The MPFOPT algorithm is demonstrated to provide several orders of magnitude faster solution times than standard optimization methods like IPOPT, MIPS, and KNITRO, using significantly fewer amounts of memory. The (MPOPF) problem can be abbreviated as a general nonlinear optimal control problem with both linear and nonlinear inequality constraints:

$$\underset{x}{\text{minimize}} \; f(x) \quad (IP)$$

subject to $c_E(x) = 0,$ (a)

$$h^{min} \le h(x) \le h^{max}, \quad (b)$$

$$a^{min} \le Ax \le a^{max}, \quad (c)$$

$$x^{min} \le x \le x^{max}, \quad (d)$$

where $x \in \mathbb{R}^{N_x}$, $c_E(x) \in \mathbb{R}^{N_E}$ and (IP) (c) accounts for the equality constraints (2), (3), and (4) of the (MPOPF), h(x) ∈

$\mathbb{R}^{N_h}$ and (IP) (b) represents the thermal inequality constraints (7), the matrix $A \in \mathbb{R}^{N_A \times N_x}$ introduces linear inequality constraints (IP) (c) related to the storage devices (16), and (IP) (d) represents the box constraints on active and reactive powers (8), (9), and voltages (10) and angles (11).

In the above $N_x=2N_B+2N_G$ stands for the total number of control variables, $N_E=2N_B+2N_G$ the number of equality constraints, $N_h=4N_e$ the number of nonlinear inequality constraints, and $N_A=(N+1) N_S$ the number of linear inequality constraints.

Interior Point Solution Framework

The method of the present invention executes an interior point optimization algorithm in a computer system to solve the optimal control problem defined over a time period of interest T, where the objective function associated with the optimal control problem represents the total fuel consumption of the generators for the time period of interest T.

For clarity, we let nonlinear and linear inequality constraints be represented by the single vector $c_I(x)$. The vectors indicating the combined inequality constraints and their associated lower and upper bounds are $$c_I(x) = \begin{bmatrix} h(x) \\ Ax \\ x \end{bmatrix}, c^{min} = \begin{bmatrix} h^{min} \\ a^{min} \\ x^{min} \end{bmatrix}, c^{max} = \begin{bmatrix} h^{max} \\ a^{max} \\ x^{max} \end{bmatrix}. \quad (17)$$

Slack variables $s \in \mathbb{R}^{N_h+N_A}$, $s>0$, are introduced to convert inequality constraints to equality constraints shifting the upper and lower bounds to themselves as non negativity constraints. The non negativity constraints then are replaced by the standard log barrier function, obtaining a sequence of $\mu$-subproblems (IP($\mu$)), $$\underset{x}{\text{minimize}}\ f(x) - \mu \sum_{i=1}^{N} \log(s_i), \quad \text{(IP}(\mu)\text{)}$$

subject to $c_E(x) = 0,$ (a)

$c_I(x) - s = 0,$ (b)

$s > 0.$ (c)

Each subproblem (IP($\mu$)) is solved approximately and while $\mu$ decreases, the solution of the next barrier problem is obtained using, as a starting guess, the approximate solution of the previous one. While the barrier parameter $\mu>0$ is driven to zero and provided that the objective function and the constraints are sufficiently smooth, the limit of the corresponding solutions of (IP($\mu$)) satisfies first order optimality conditions for (IP) when the constraint Jacobian has full rank (Jorge Nocedal and Stephen J. Wright. *Numerical Optimization: Springer Series in Operations Research and Financial Engineering*. Springer, 2006). The algorithm does not require the feasibility of the iterates with respect to the inequality constraints, but only forces the slack variables to remain positive. The solutions of (IP($\mu$)) are critical points of the Lagrangian function $$L(x, s, \lambda_E, \lambda_I) = f(x) - \mu \sum_{i=1}^{N} \log(s_i) + \lambda_E^\top c_E(x) + \lambda_I^\top (c_I(x) - s) \quad (18)$$

and thus satisfy the KKT conditions $\nabla_x f(x) + \lambda_E^T \nabla_x c_E(x) + \lambda_I^T \nabla_x c_I(x) = 0,$ $-\mu e - S\lambda_I = 0,$ $c_E(X) = 0,$ $c_I(x) - s = 0,$ (19)

where the last of the equations has been obtained by post multiplying with $S=\text{diag}(s)$ and e is a vector with all its entries equal to one. For convenience, we define the Jacobian of the equality constraints $J_E = \nabla_x c_E(x)$ and the Jacobian of the inequality constraints $J_I = \nabla_x c_I(x)$.

The optimality error $E_0$ (x, s, $\lambda_E$, $\lambda_I$) is defined as the maximum of the $\| \|_\infty$ norms of the individual parts of the KKT conditions (19), appropriately scaled to account for the case where the Lagrange multipliers $\lambda_I$, $\lambda_E$ and the slack variables s can become very large (see (Andreas Wächter and Lorenz T. Biegler. On the implementation of an interior-point filter line-search algorithm for large-scale nonlinear programming. *Math. Program.*, 106(1, Ser. A):25-57, 2006) for details). The algorithm terminates if the optimality error at an approximate solution $(x^{kT}, s^{kT}, \lambda_E^{kT}, \lambda_I^{kT})^T$ is such that $E_0(x^k, s^k, \lambda_E^k, \lambda_I^k) \leq \epsilon_{tol}$, where $\epsilon_{tol}$ is the user provided error tolerance.

According to the present invention, the interior point algorithm is characterized by the fact of executing the following steps:

storing a KKT system associated with the optimality conditions for the Lagrangian associated with said objective function and said constraints defined for said time period T, the KKT system including a Hessian matrix H;

reordering the KKT system to obtain a reordered KKT system where the Hessian matrix H after the reordering has an arrowhead structure with diagonal blocks $A_n$ and off diagonal blocks $B_n$ comprising several identical copies of constant in time matrix B of charging and discharging ratios of said storages device;

executing a direct Schur complement based factorisation and solution algorithm on said reordered KKT system;

returning output parameters for said network, buses, loads, generators and storages devices as a solution of said optimal control problem for each of said time intervals.

All these steps are explained in more detail below.

Solution of the Barrier Subproblem (IP($\mu$))

The computation of the search direction is obtained by a damped Newton method applied on the KKT conditions (19). Let k denote the iteration counter for the problem (IP($\mu$)). The solution update iterate $(x^{k+1}, s^{k+1}, \lambda_E^{k+1}, \lambda_I^{k+1})$, is obtained from $(x^k, s^k, \lambda_E^k, \lambda_I^k)$ and the search directions $(\delta x^k, \delta s^k, \delta \lambda_E^k, \delta \lambda_I^k)$, which are computed from the linearisation of the KKT conditions at $(x^k, s^k, \lambda_E^k, \lambda_I^k)$, to obtain the KKT system $$\begin{bmatrix} H & 0 & J_E^\top & J_I^\top \\ 0 & -S^{-1}\Lambda_I & 0 & -I \\ J_E & 0 & 0 & 0 \\ J_I & -I & 0 & 0 \end{bmatrix} \begin{bmatrix} \delta x^k \\ \delta s^k \\ \delta \lambda_E^k \\ \delta \lambda_I^k \end{bmatrix} = - \begin{bmatrix} (\nabla_x f(x))^\top + J_E^\top \lambda_E + J_I^\top \lambda_I \\ -\mu S^{-1} e - \lambda_I \\ c_E(x) \\ c_I(x) - s \end{bmatrix}, \quad (20)$$

where $H = \nabla_{xx} L$ and, similarly for S, $\Lambda_I = \text{diag}(\lambda_I)$. To enforce symmetry we have multiplied the second equation with $S^{-1}$. In practice, however, in order to guarantee certain descent properties of the filter line-search procedure (Andreas Wächter and Lorenz T. Biegler. On the implementation of an interior-point filter line-search algorithm for large-scale nonlinear programming. *Math. Program.*, 106 (1, Ser. A):25-57, 2006), the diagonal blocks of the KKT matrix at the left-hand side of (20) are modified by multiples of the identity matrix as described in (Andreas Wächter and Lorenz T. Biegler. On the implementation of an interior-point filter line-search algorithm for large-scale nonlinear programming. *Math. Program.*, 106 (1, Ser. A):25-57, 2006). For large-scale optimal control problems, the computation of the search directions determines the running time of the optimal control problem. Hence, any attempt accelerating the solution of (IP) should focus on the efficient solution of the KKT linear system (20).

Solution of the KKT System

A widespread approach for solving KKT systems consists of employing black-box solution techniques of multifrontal sparse LU type (O. Schenk and K. Gärtner. On fast factorization pivoting methods for sparse symmetric indefinite systems. *Elec. Trans. Numer. Anal.*, 23:158-179, 2006), (Timothy A. Davis and Iain S. Duff. An unsymmetric-pattern multifrontal method for sparse lu factorization. *SIAM Journal on Matrix Analysis and Applications*, 18(1):140-158, 1997), (Hsl. a collection of fortran codes for large scale scientific computation. URL http://www.hsl.rl.ac.uk), due to their accuracy and robustness. However, such solvers are not aware of the particular structural properties of the generated KKT systems, which appropriately exploited could result in significant computational savings. According to the invention, a direct sparse technique adapted to the temporal structure of the MPOPF problem is used.

Temporal Structure Revealing Ordering

Each one of the variables of every iterate (x, s, $\lambda_E$, $\lambda_I$) represents the corresponding parameters from all time periods. More precisely, $$x = [\theta^T \, V^T \, p^T \, q^T]^T, \theta = [\theta_1^T \, \theta_2^T \ldots \theta_N^T]^T,$$

and the rest of the variables v, p, q are ordered in a similar way. According to the invention, the following ordering has been adopted to reveal the temporal structure of the Hessian:

$$u = [x_1^T, \lambda_{E1}^T, \lambda_{I1}^T, s_1^T, \ldots x_N^T, \lambda_{EN}^T, \lambda_{IN}^T, s_N^T, \lambda_A^T]^T, \quad (21)$$

where the variables $x_n$, are ordered as $$x_n = [\theta_n^T \, V_n^T \, p_n^T \, q_n^T]^T, \quad (22)$$

and $s_E \in \mathbb{R}^{N_s}$ are the slack variables for the storage equality constraints (16), introduced as an inequality constraint with identical upper and lower bounds. This constraint couples all time steps and unless it is ordered after all other variables, we cannot then obtain the reordered KKT system (24). Under the new ordering (21) the Hessian matrix obtains the arrowhead structure with the diagonal blocks $A_n$ also reordered:

$$\begin{bmatrix} A_1 & & & & B_1 \\ & A_2 & & & B_2 \\ & & \ddots & & \vdots \\ & & & A_N & B_N \\ B_1^T & B_2^T & \ldots & B_N^T & C \end{bmatrix}, \quad (23)$$

$$A_n = \begin{bmatrix} H_n & J_{En}^T & J_{In}^T & 0 \\ J_{En} & 0 & 0 & 0 \\ J_{In} & 0 & 0 & -S_n \\ 0 & 0 & -S_n & \Lambda_{In} \end{bmatrix}.$$

Figure 7:
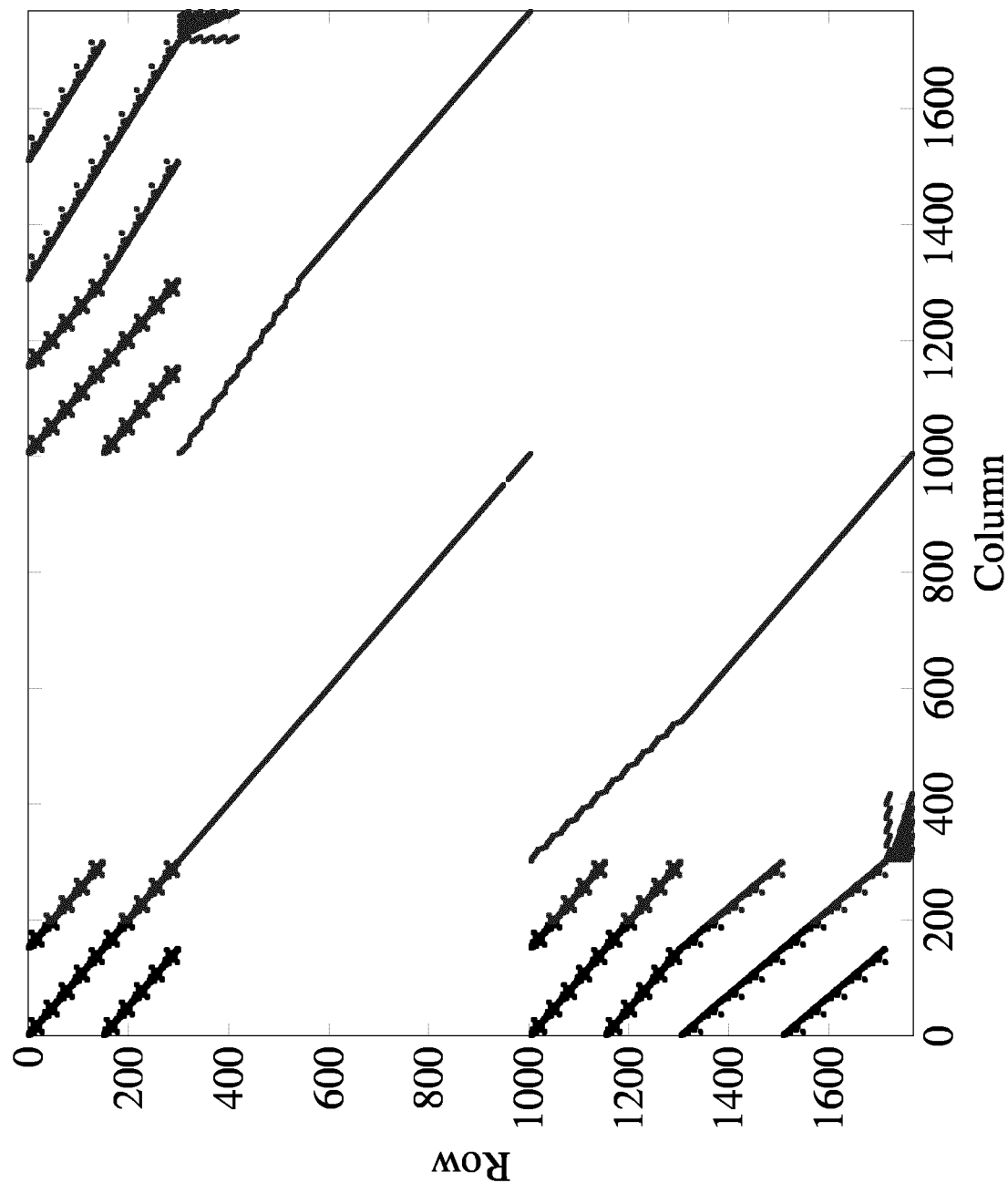
FIG. 7 is a plot representing the sparse structure of the Hessian matrix of the KKT system for the power grid described by the case IEEE30 according to the method of the prior art, wherein the control parameters vary over N=5 predefined time intervals of the time period T of interest.
Figure 8:
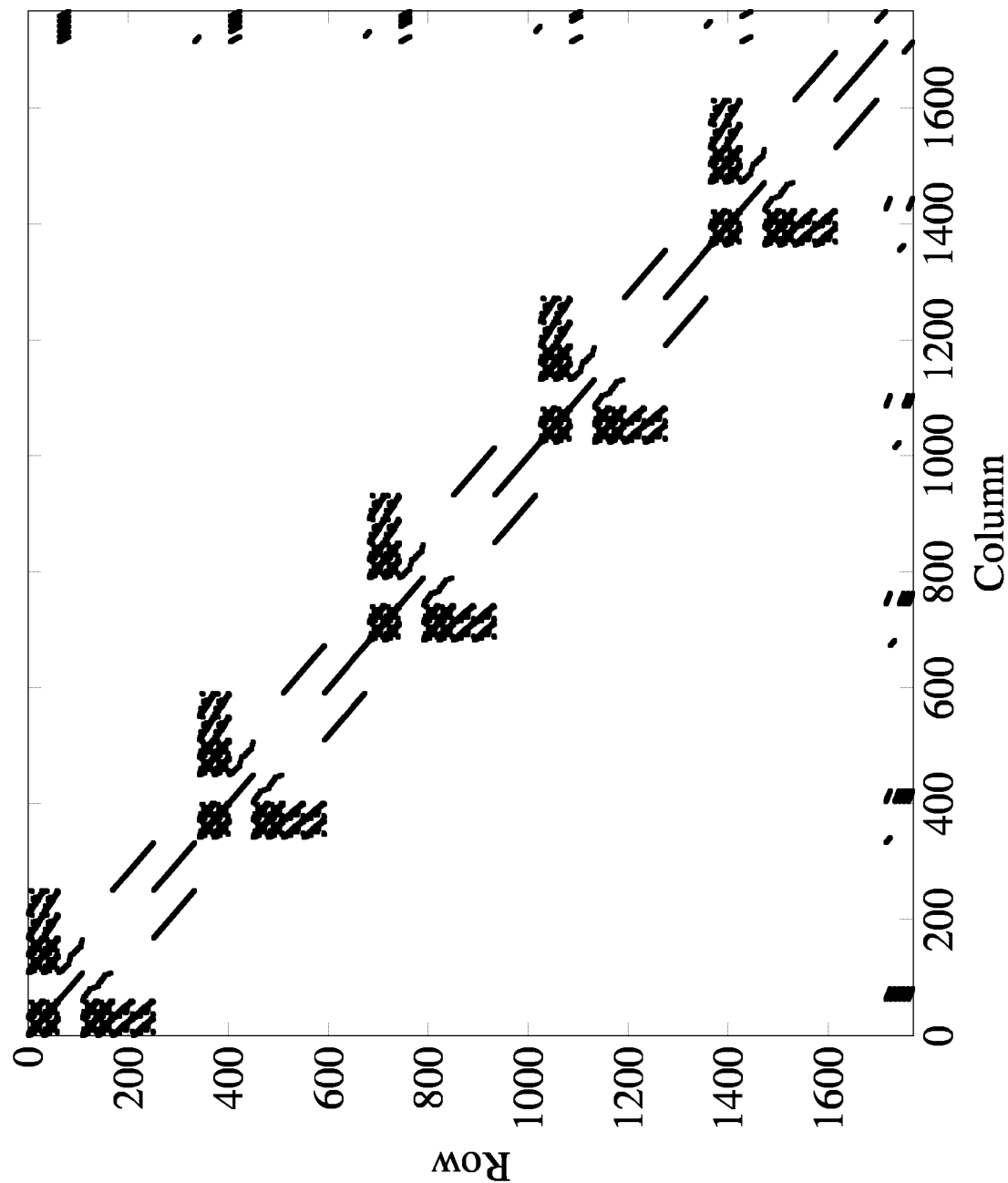
FIG. 8 is a plot representing the sparse structure of the Hessian matrix associated with the reordered KKT system derived from the KKT system of FIG. 7, according to a method step of the present invention.

The sparse structure of the Hessian for the power network described by case IEEE30 with N=5 is depicted in FIG. 7 before the reordering and in FIG. 8 after the reordering. The reordered KKT system becomes $$\begin{bmatrix} A_1 & & & & B_1 \\ & A_2 & & & B_2 \\ & & \ddots & & \vdots \\ & & & A_N & B_N \\ B_1^T & B_2^T & \ldots & B_N^T & C \end{bmatrix} \begin{bmatrix} x_1 \\ x_2 \\ \vdots \\ x_N \\ x_c \end{bmatrix} = \begin{bmatrix} b_1 \\ b_2 \\ \vdots \\ b_N \\ b_c \end{bmatrix} \quad (24)$$

and it is solved with the Schur-based approach described next.

The Direct Schur-Based Approach

Figure 9:
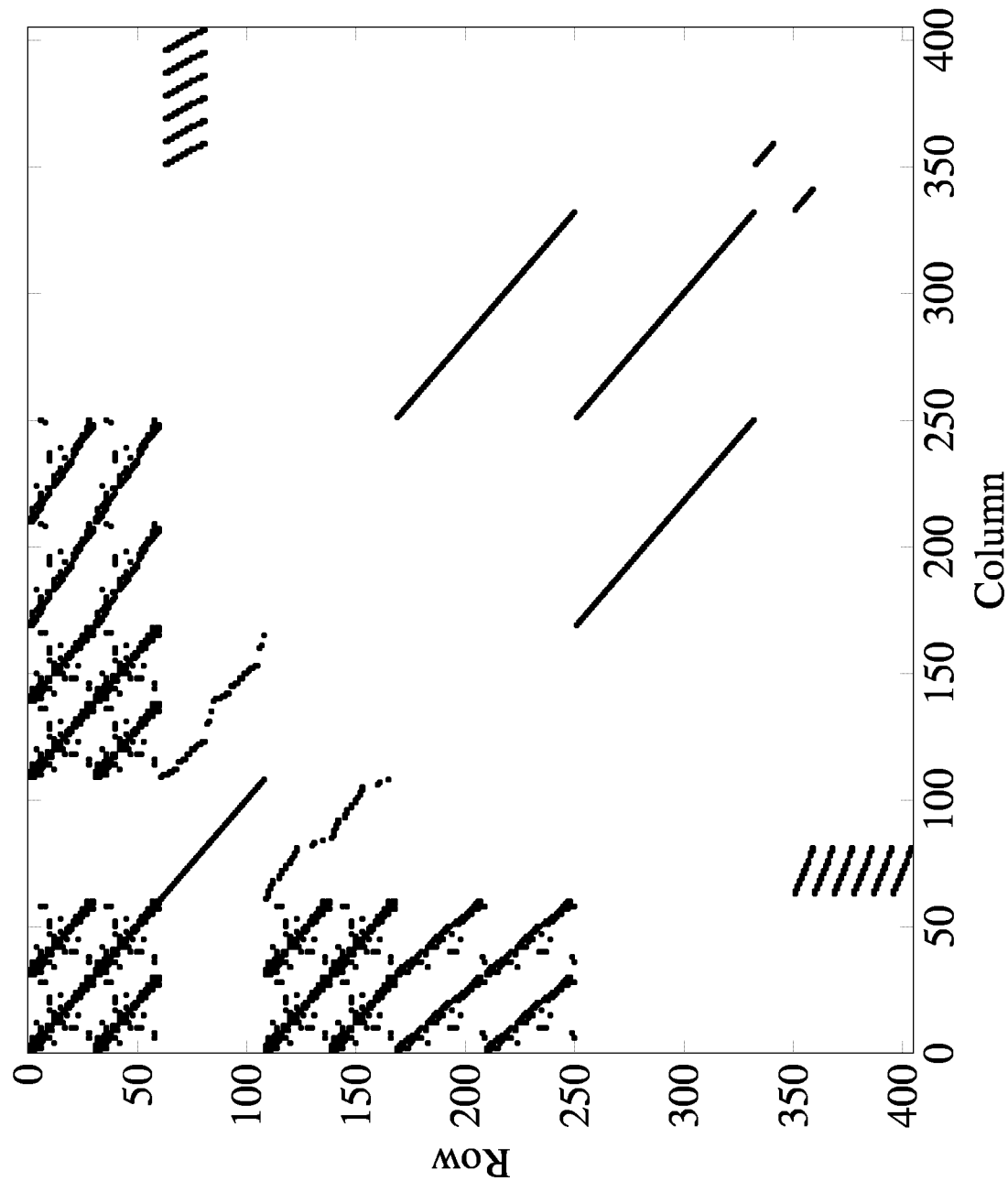
FIG. 9 is a plot representing the sparse structure of the auxiliary matrix $P_n$ for n=1, associated with the reordered KKT system of FIG. 8.
Figure 10:
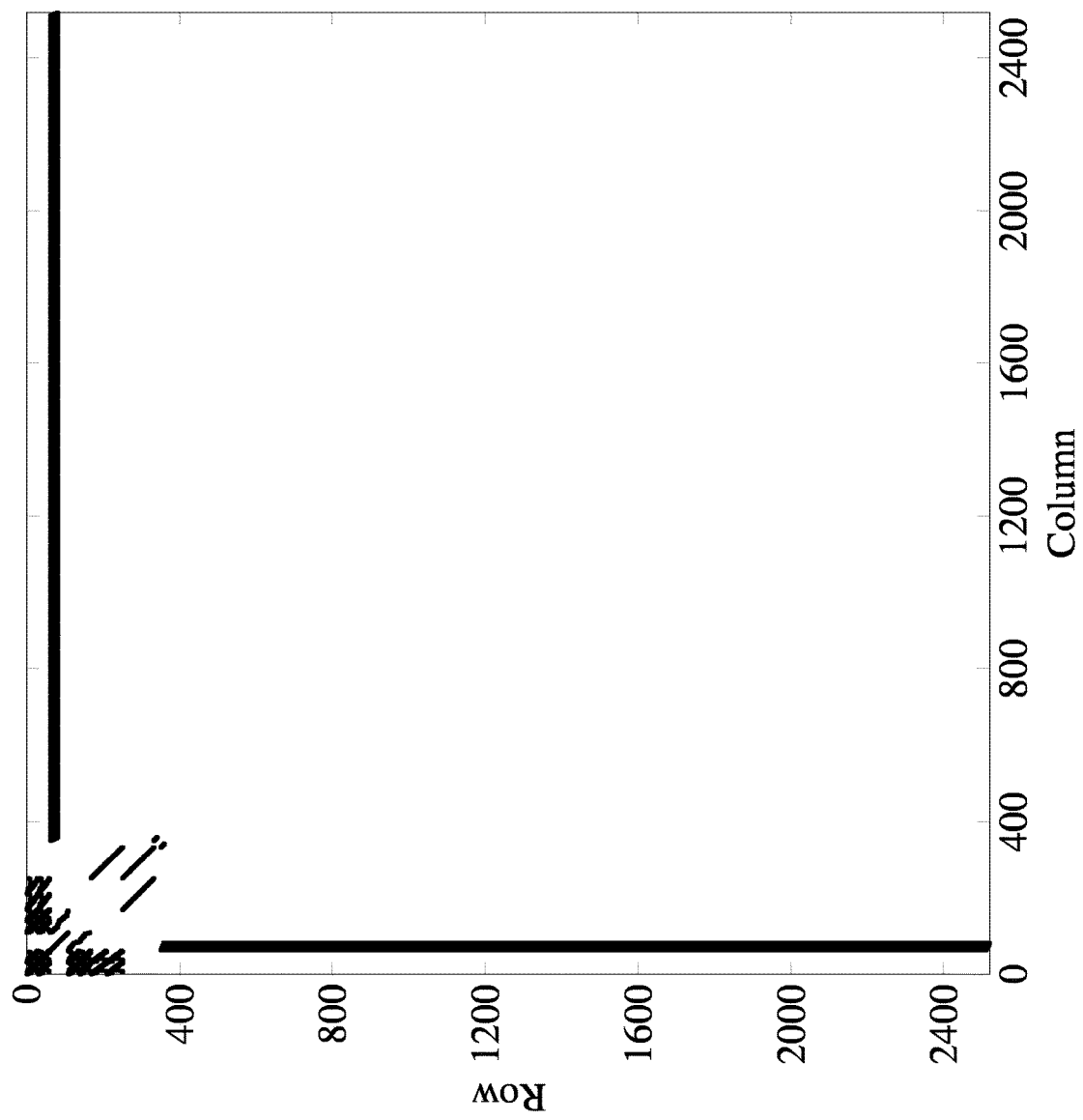
FIG. 10 is a plot representing the sparse structure of the auxiliary matrix $P_n$ for n=1, associated with a reordered KKT system similar to that of FIG. 8, wherein the number of predefined time intervals is set to N=240.

The arrowhead structure of the reordered KKT system (24) calls for a direct Schur-complement-based solution approach. The algorithm is well known (Cosmin G. Petra, Olaf Schenk, Miles Lubin, and Klaus Gärtner. An augmented incomplete factorization approach for computing the schur complement in stochastic optimization. *SIAM Journal on Scientific Computing*, 36 (2): C139-C162, 2014b), (C. G. Petra, O. Schenk, and M. Anitescu. Real-time stochastic optimization of complex energy systems on high-performance computers. *Computing in Science Engineering*, 16 (5):32-42, September 2014a) and it is sketched in Alg. 1 for the factorization and Alg. 2 for the associated solution. The Schur complement of each individual block at the step Alg.1.5, is computed by an incomplete augmented factorization technique that solves the sparse linear systems with multiple right-hand sides at once using an incomplete sparse factorization of an auxiliary matrix. This technique is implemented in the direct sparse solver PARDISO (O. Schenk and K. Gärtner. On fast factorization pivoting methods for sparse symmetric indefinite systems. *Elec. Trans. Numer. Anal.*, 23:158-179, 2006); see (Cosmin G. Petra, Olaf Schenk, Miles Lubin, and Klaus Gärtner. An augmented incomplete factorization approach for computing the schur complement in stochastic optimization. *SIAM Journal on Scientific Computing*, 36(2):C139-C162, 2014b), (C. G. Petra, O. Schenk, and M. Anitescu. Real-time stochastic optimization of complex energy systems on high-performance computers. *Computing in Science Engineering*, 16(5):32-42, September 2014a) for more details. The auxiliary matrix provided to PARDISO is the augmented block matrix $P_n$, $$P_n = \begin{bmatrix} A_n & B_n \\ B_n^T & 0 \end{bmatrix}, \quad (25)$$

the structure of which is depicted in FIG. 9 for the power network described by case IEEE30 and N=5 and in FIG. 10 for the same power network and N=240. In this mode, PARDISO factorizes only the $A_n$, block of the matrix and then computes the Schur complement $S_n$, which is a dense matrix if the columns of $B_n$, are all nonzero. The final Schur complement $S_c$ is in general dense, or it consists of a very large dense block. The dense system at the step Alg.1.8 and Alg.2.7 can be solved with a dense LU decomposition using LAPACK (E. Anderson, Z. Bai, C. Bischof, S. Blackford, J. Demmel, J. Dongarra, J. Du Croz, A. Greenbaum, S. Hammarling, A. McKenney, and D. Sorensen. *LAPACK Users' Guide*. Society for Industrial and Applied Mathematics, Philadelphia, Pa., third edition, 1999).

For a relatively small number of time periods N<100, Alg. 1, Alg. 2, and PARDISO applied on the prereordered KKT system (20) have similar runtime performance. However, as the number of time periods N increases, the Schur complements $S_n$ of the augmented $P_n$ blocks exceed by far the size of the $A_n$ blocks. As a result the solution approach based on Alg. 1, Alg. 2 becomes ineffective both with respect to the computational time and with respect to memory consumption, compared with the direct sparse solver PARDISO applied on the original prereordered KKT system (20). The performance, however, can be further improved by exploiting the particular structure of the off diagonal blocks $B_n$ described next.

---
Algorithm 1 Direct Schur-based factorization.
---

1: function DIRECTSCHURFACTORIZATION($A_n$, $B_n$, C, n = 1, ..., N)
2:     $S_c := C$
3:     for n = 1 : N do
4:        $[L_n, U_n] :=$ pardisoFactorize($A_n$)
5:        $S_n := -B_n A_n^{-1} B_n^T$
6:        $S_c := S_c + S_n$
7:     end for
8:     $[L_s, U_s] :=$ luFactorize($S_c$)
9:     return $[L_n, U_n]$, n = 1, ..., N, $[L_s, U_s]$
10: end function ---
Algorithm 2 Direct Schur-based back substitution.
---

1: function DIRECTSCHURBACKSUBSTITUTION($[L_n, U_n]$, $B_n$, n = 1, ..., N, b)
2:     $r_c := b_c$
3:     for n = 1 : N do
4:        $y_n :=$ pardisoSolve($L_n$, $U_n$, $b_n$)
5:        $r_c := r_c - B_n y_n$
6:     end for
7:     $x_c :=$ luSolve($L_s$, $U_s$, $r_c$)
8:     for n = 1 : N do
9:        $r_n := b_n - B_n^T x_c$
10:        $x_n :=$ pardisoSolve($L_n$, $U_n$, $r_n$)
11:     end for
12:     return x
13: end function Exploiting Constant in Time Blocks of $B_n$ For a general $B_n$ the reordering of the KKT system (20) does not lead to an approach more efficient than the one implemented in general purpose direct sparse solvers (O. Schenk and K. Gärtner. On fast factorization pivoting methods for sparse symmetric indefinite systems. *Elec. Trans. Numer. Anat.*, 23:158-179, 2006), (Hsl. a collection of fortran codes for large scale scientific computation. URL http://www.hsl.rl.ac.uk), (Timothy A. Davis and Iain S. Duff. An unsymmetric-pattern multifrontal method for sparse lu factorization. *SIAM Journal on Matrix Analysis and Applications*, 18(1): 140-158, 1997), despite the convenient arrowhead sparse structure that allows the direct Schur complement-based algorithm, Alg. 1. The equations of storage devices however, give rise to $B_n$ with special properties that allow for a much more efficient implementation of Alg. 1.

More precisely, the matrices $B_n$, n=1, 2, ..., N, obtain the form $$\begin{bmatrix} B_1 \\ B_2 \\ \vdots \\ B_n \\ \vdots \\ B_N \end{bmatrix} = \begin{bmatrix} 0 & B_1^1 & B & B & B & \cdots & B \\ 0 & B_2^1 & B_2^2 & B & B & \cdots & B \\ \vdots & \vdots & \vdots & \vdots & \vdots & \ddots & \vdots \\ 0 & B_n^1 & O & B_n^2 & B & \cdots & B \\ \vdots & \vdots & \vdots & \vdots & \vdots & \ddots & \vdots \\ 0 & B_N^1 & 0 & 0 & \cdots & 0 & B_N^2 \end{bmatrix}, \quad (26)$$

where $$O = 0_{n-2}, 0_m = [\underbrace{0 \; 0 \; \cdots \; 0}_{m}],$$

and $B \in \mathbb{R}^{N_A \times N_S}$. It is not hard, after some algebraic manipulations, to see that the Schur complement matrix for the nth block $S_n$ will obtain the form $$S_n = \begin{bmatrix} 0 & 0 & O & 0 & 0 & \cdots & 0 \\ 0 & S_{11} & O & S_{12} & S_{10} & \cdots & S_{10} \\ O & O & O & O & O & \cdots & O \\ 0 & S_{12}^T & O & S_{22} & S_{20} & \cdots & S_{20} \\ 0 & S_{10}^T & O & S_{20}^T & S_{00} & \cdots & S_{00} \\ \vdots & \vdots & \vdots & \vdots & \vdots & \ddots & \vdots \\ 0 & S_{10}^T & O & S_{20}^T & S_{00}^T & \cdots & S_{00} \end{bmatrix}_n . \quad (27)$$

Let $S_n^3$ be the top 3 by 3 block matrix of $S_n$:

$$S_n^3 = \begin{bmatrix} S_{11} & S_{12} & S_{10} \\ S_{12}^T & S_{22} & S_{20} \\ S_{10}^T & S_{20}^T & S_{00} \end{bmatrix}. \quad (28)$$

It is evident from the structure of $S_n$ that only $S_n^3$ needs to be computed, since the rest of the rows and columns are direct replicates of the entries of the last row and column of $S_n^3$. Thus, the computation of $S_n$ becomes independent of the number of time periods N and it only depends on the number of storage devices $N_S$, since each one of the blocks of $S_n$ has size $N_S \times N_S$. The global Schur complement S, after the end of the loop at Alg.1.7 will have the form $$S_c = \begin{bmatrix} S_{11} & S_{12} & S_{13} & S_{14} & \cdots & S_{1N} \\ S_{12}^T & S_{22} & S_{23} & S_{23} & \cdots & S_{23} \\ S_{13}^T & S_{23}^T & S_{33} & S_{34} & \cdots & S_{34} \\ S_{14}^T & S_{23}^T & S_{34}^T & S_{44} & \cdots & S_{45} \\ \vdots & \vdots & \vdots & \vdots & \ddots & \vdots \\ S_{1N}^T & S_{23}^T & S_{34}^T & S_{45}^T & \cdots & S_{NN} \end{bmatrix}, \quad (29)$$

where each block of the first block row and column have dimensions $2N_S \times 2N_S$, whereas the remaining blocks of $S_c$ have dimensions $N_S \times N_S$. Storing $S_c$ due to its special structure, requires only three block vectors: one for the first block column $S_1$ of size $2N_S(N+1) \times 2N_S$, one for the diagonal blocks $S_d$ of size $N_S \times NN_S$, and one for the off diagonal blocks $S_o$ of size $N_S \times (N-1)N_S$, $$S_1 = [S_{12} \ S_{13} \ S_{14} \ldots S_{1N}], \quad (30)$$

$$S_d = [S_{22} \ S_{33} \ S_{44} \ldots S_{NN}], \quad (31)$$

$$S_o = [S_{23} \ S_{34} \ S_{45} \ldots S_{N-1N}], \quad (32)$$

significantly reducing this way the storage requirements for $S_c$.

The matrix $S_c$ may be written as a 2 by 2 block matrix $$S_c = \begin{bmatrix} S_{11} & S_1 \\ S_1^T & S_{22} \end{bmatrix}, \quad (33)$$

where the matrix $S_{22}$ is what remains from $S_c$ if we remove the first block row and column. The vectors $r_c$, $x_c$ may be partitioned as $r_c = [r_c^1 \ r_c^2]^T$, $x_c = [x_c^1 \ x_c^2]^T$, where the size of $x_c^1$ is equal to the number of rows of the $S_{11}$ block. Once the Schur complement $S_c$ has been computed, the dense linear system on line Alg.2.7 has to be solved for $x_c$.

This is achieved by forming the Schur complement of $S_c$ with respect to the $S_{11}$ block as described in Alg. 3. The operator $S_{22}$ in all three steps of Alg. 3 is inverted

---

Algorithm 3 Schur-based method for the Schur system.

1: function SOLVEDENSESCHUR($S_{11}$, $S_1$, $S_{22}$, $r_c$)
2:    $S := S_{11} - S_1 S_{22}^{-1} S_1^T$
3:    $x_c^1 := S^{-1}(r_c^1 - S_1 S_{22}^{-1} r_c^2)$
4:    $x_c^2 := S_{22}^{-1}(r_c^2 - S_1^T x_c^1)$
5:    return $x_c$
6: end function

--- by an $LDL^T$ factorization (Gene H. Golub and Charles Van Loan. Matrix Computations. The Johns Hopkins University Press, 3rd edition, 1996). The factorization has complexity $O(n^3)$ for general symmetric matrices of $\mathbb{R}^{n \times n}$ and the associated back substitution has complexity $O(n^2)$. Exploiting the fact that the blocks below the main diagonal of each column of $S_{22}$ are identical, we can perform the factorization in $O(n^2)$ operations. At the same time, according to the present invention, in order to save memory we can operate in block vector representations of the matrices instead of dense block matrices. The algorithms described next operate on the block vector representation $S_d$, $S_o$, of the matrix $S_{22}$. The $LDL^T$ factorization of $S_{22}$ only requires block vector representation of the factors. This process is summarized in Alg. 4. The back substitution can be performed in $O(n)$ instead

---

Algorithm 4 Structure-exploiting $LDL^T$ factorization.

1: function BLOCKLDLTFACT($S_d$, $S_o$)
2:    $L := S_d$, $U := S_o$, $D := S_o$
3:    for k = 1 : N − 1 do
4:      $L_{k+1} := L_{k+1}/D_k$
5:      for j = k + 1 : N − 1 do
6:        $D_j := D_j - L_{k+1} U_{k+1}$
7:        $L_{j+1} := L_{j+1} - L_{k+1} U_{k+1}$
8:        $U_{j+1} := U_{j+1} - L_{k+1} U_{k+1}$
9:      end for
10:    $D_N := D_N - L_N U_N$
11:    end for
12:    return L, D, U
13: end function

--- of $O(n^2)$. This process is summarized in the Alg. 5. Since the matrix $S_{22}$ has a block structure with N−1 blocks in $\mathbb{R}^{N_S \times N_S}$, the complexity for the factorization is $O((N-1)^2 N_S^3)$ and for the back substitution $O((N-1) N_S^2)$.

---

Algorithm 5 Structure-exploiting $LDL^T$ backsubstitution.

1: function BLOCKLDLTSOLVE(L, D, U, B)
2:    Y := B                          ▷ Solve LY = B
3:    $Y_s := L_2 Y_1$
4:    for k = 1 : N − 1 do
5:      $Y_k := Y_k - Y_s$
6:      $Y_s := Y_s + L_{k+1} Y_k$
7:    end for
8:    $Y_N := Y_N - Y_s$
9:    $X_N := D_N Y_N$                 ▷ Solve DUX = Y
10:    $X_s := X_N$
11:    for k = N − 1 : 1 do
12:      $X_k := Y_k - U_{k+1} X_s$
13:      $X_k := D_k X_k$
14:      $X_s := X_s + X_k$
15:    end for
16:    return X
17: end function

---

Memory Economical Approach

The factorization phase described in Alg. 1 stores all the sparse LU factorizations of the N matrices $A_n$ in memory. However, for very detailed power grid models the associated matrices $A_n$ can be very large. The same is true even for small power grid models and high values of N. In these cases the memory for storing the L, U factors may become critical and thus the approach described in Alg. 1 and Alg. 2 may not be applicable.

To remedy this problem, according to an aspect of the present invention, Alg. 6 is provided. This algorithm sacrifices performance, computing the factorisation of each diagonal block $A_n$ twice. First during the computation of the global Schur complement and Schur right-hand side, at line Alg. 6.5, for computing the local contribution $S_n$ to the global Schur-complement matrix $S_c$ and the contribution to the Schur right-hand side $r_c$. Then the factorisation is computed one more time at line Alg. 6.13 for computing the solution vector $x_n$, at line Alg. 6.15. Once the factorisation serves its purpose, the algorithm releases the memory occupied by the L, U factors and proceeds to the next block $A_{n+1}$. In contrast to the approach described by Alg. 1, only memory for a single factorisation is needed.

---

Algorithm 6 Low memory Schur-based approach.

1: function BLOCKLDLTSOLVE($A_n$, $B_n$, C, $b_n$, n = 1, ..., N)
2:    $S_c := C$
3:    $r_c := b_c$
4:    for n = 1 : N do
5:      $[L_n, U_n] := $ pardisoFactorize($A_n$)
6:      $S_n := -B_n A_n^{-1} B_n^T$
7:      $S_c := S_c + S_n$
8:      $y_n := $ pardisoSolve($L_n$, $U_n$, $b_n$)
9:      $r_c := r_c - B_n Y_n$
10:    end for
11:    $r_c := S_c^{-1} r_c$
12:    for n = 1 : N do
13:      $[L_n, U_n] := $ pardisoFactorize($A_n$)
14:      $r_n := b_n - B_n^T x_c$
15:      $x_n := $ pardisoSolve($L_n$, $U_n$, $r_n$)
16:    end for
17:    return $x_n$, n = 1,..., N
18: end function

---

Results

In this section, the performance of MPFOPT, according to the method of the present invention, for several benchmark cases of increasing complexity, is evaluated. Simulations are performed on the reference grids modeled by IEEE30, IEEE118, PEGASE1354, and PEGASE13659 included in the MATPOWER library. The associated graphs for these networks are depicted in FIG. 1, FIG. 2, FIG. 3, and FIG. 4. We remark that the scope of these figures is not to precisely identify buses, transmission lines, and their connections to generators or loads, but instead to give an idea on the increasingly higher complexity of the networks that can be processed by the method of the present invention.

The simulation specific parameters for the grid are summarized in Table 1. For comparison we also consider three alternative optimisation algorithms provided in the MATPOWER 6.0 library (R. D. Zimmerman, C. E. Murillo-Sanchez, and R. J. Thomas. MATPOWER: Steady-State Operations, Planning, and Analysis Tools for Power Systems Research and Education. *IEEE Transactions on Power Systems*, 26(1):12-19, February 2011), namely, IPOPT (Andreas Wächter and Lorenz T. Biegler. Line search filter methods for nonlinear programming: motivation and global convergence. *SIAM J. Optim.*, 16(1):1-31 (electronic), 2005), (Andreas Wächter and Lorenz T. Biegler. On the implementation of an interior-point filter line-search algorithm for large-scale nonlinear programming. *Math. Program.*, 106(1, Ser. A): 25-57, 2006) and MIPS (H. Wang. *On the Computation and Application of Multi-period Security-constrained Optimal Power Flow for Real-time Electricity Market Operations.* PhD thesis, Electrical and Computer Engineering, Cornell University, May 2007), (H. Wang, C. E. Murillo-Sanchez, R. D. Zimmerman, and R. J. Thomas. On computational issues of market-based optimal power flow. *IEEE Transactions on Power Systems*, 22(3):1185-1193, August 2007), that adopt an IP approach, and KNITRO (Richard H. Byrd, Jorge Nocedal, and Richard A. Waltz. Knitro: *An Integrated Package for Nonlinear Optimization*, pages 35-59. Springer U S, Boston, Mass., 2006. ISBN 978-0-387-30065-8), which implements a trust-region algorithm. All our benchmarks ran on a workstation equipped with an Intel(R) Xeon(R) CPU E7-4880 v2 at 2.50 GHz and 1 TB RAM.

Figure 5:
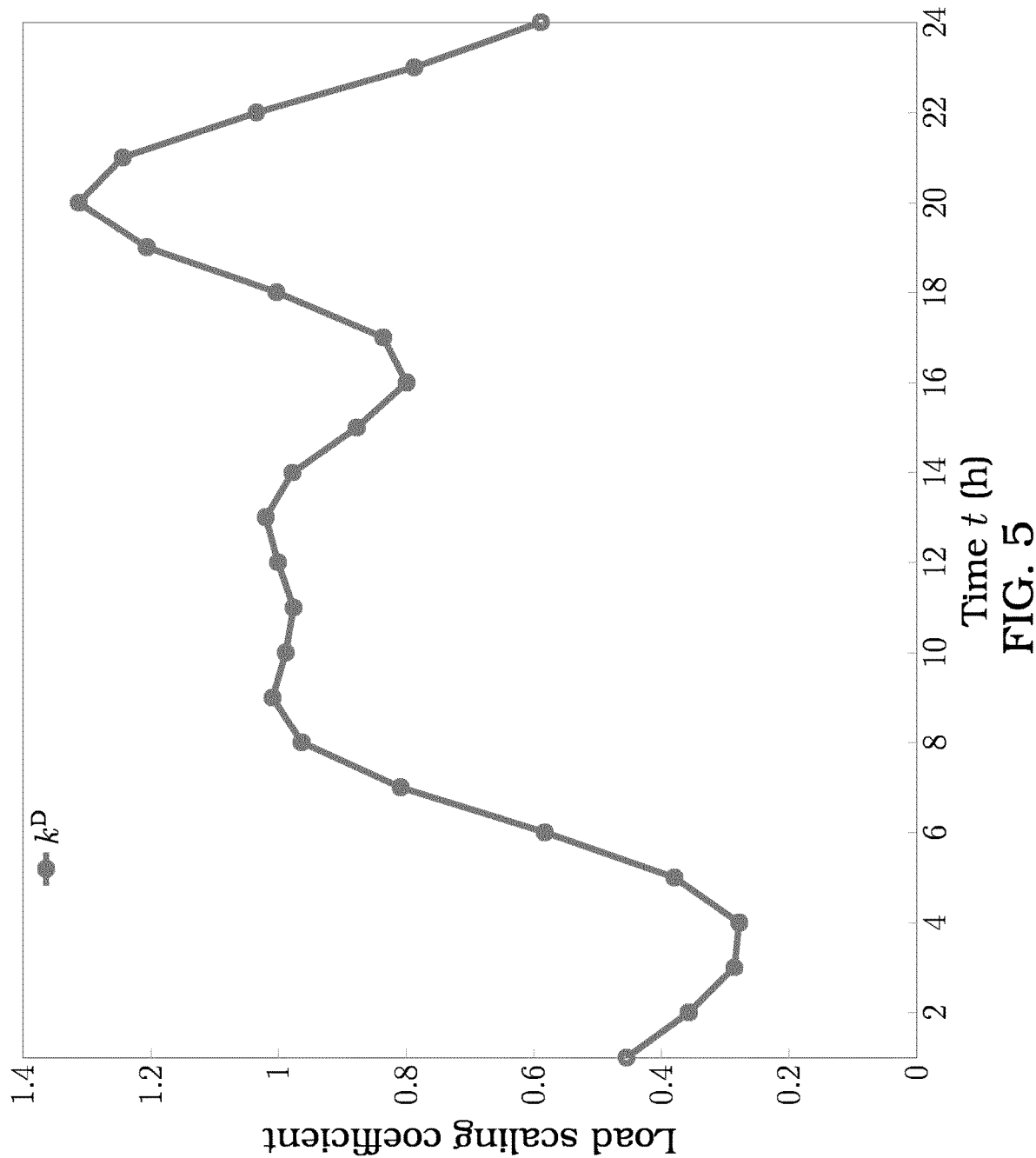
FIG. 5 is a diagram representing a network demand for a 24 hour period.

For all simulations, the length of the time period is $\delta t=1$ hour. The 24 hour load scaling profile $k^D(t)$ depicted in FIG. 5 was used for all benchmarks as a scaling factor of the nominal load demands $s^D$ given in the MATPOWER source files to generate a time dependent load $k^D(t)\underline{s}^D$. The profile shows significant fluctuations due to local PV infeed that was not modeled as dispatchable generator. To create load scalings for benchmarks with N>24, the profile was appended to itself repeatedly.

In each case file, the storages are located at the first $N_S$ buses with positive active load demand, according to the MATPOWER source file. The storage sizes $\epsilon_i^{max}$ are chosen to contain up to 2 hours of the nominal active power demand of the storage buses. If storage i is located at bus k, then $\epsilon_i^{max}=2 p_n^{D,k}$ and $\epsilon^{min}=0$. The storages are initially at a 70% charging level with $\epsilon_0=0.7\epsilon^{max}$. The storage power ratings are limited to allow a complete discharging or charging within 3 hours or 2 hours. If $p_i^n$ is the discharging or charging power of storage k, then $p_i^{max}=\epsilon_k^{max}/3$ or $p_i^{min}=-\epsilon_k^{max}/2$. All storage discharging and charging efficiencies are chosen as $\eta_{d,i}=0.97$ and $\eta_{c,i}=0.95$.

TABLE 1

Power grid models.

| Name | Buses | Branches | Generators | Storages |
|---|---|---|---|---|
| IEEE30 | 30 | 41 | 6 | 6 |
| IEEE118 | 118 | 186 | 54 | 9 |

TABLE 1-continued

Power grid models.

| Name | Buses | Branches | Generators | Storages |
|---|---|---|---|---|
| PEGASE1354 | 1354 | 1991 | 260 | 50 |
| PEGASE13659 | 13659 | 20467 | 4092 | 100 |

Figure 6:
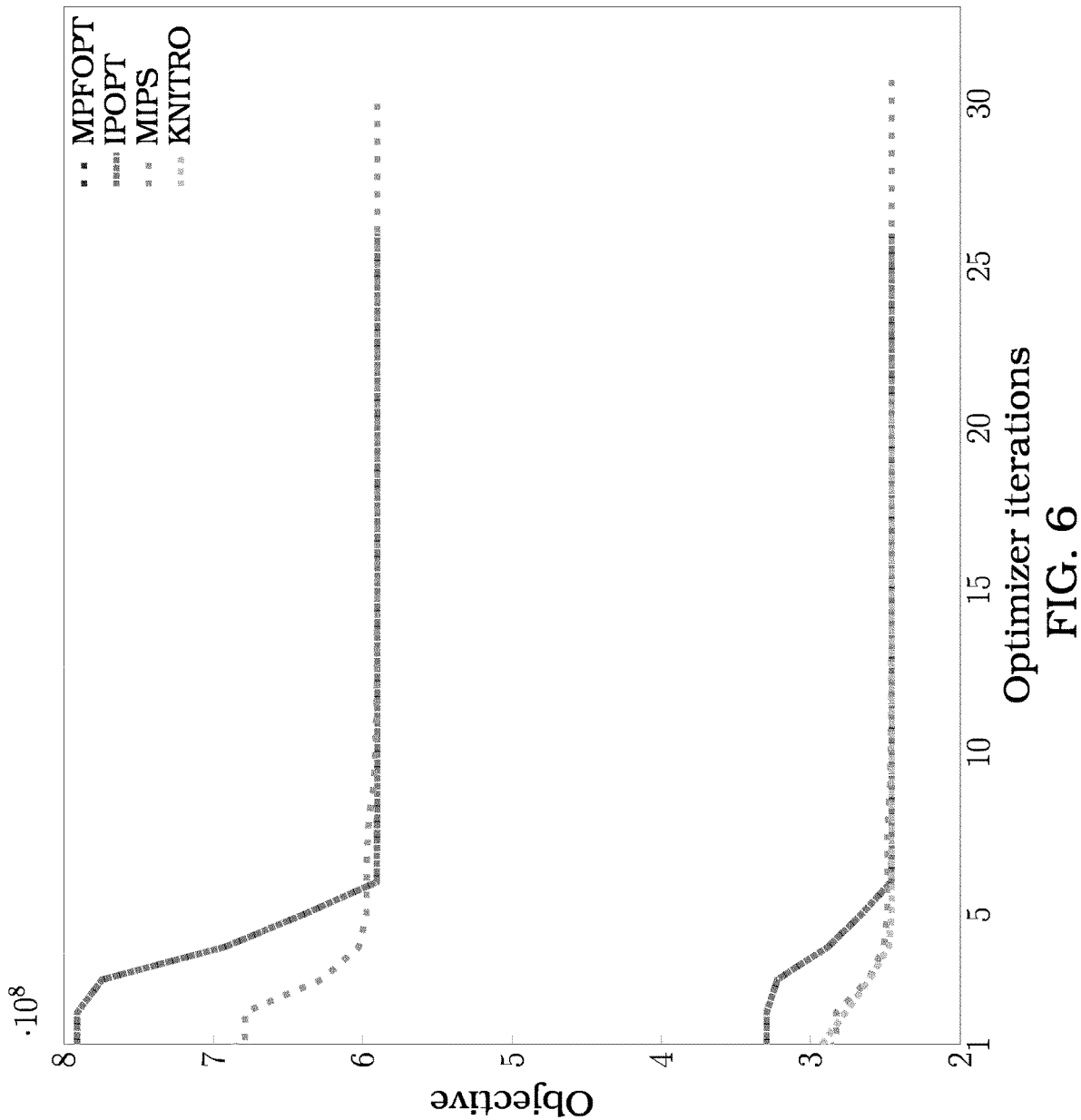
FIG. 6 is two diagrams representing the number of iterations until convergence of the method of present invention (MPFOPT) together with other popular NLP based OPF methods, wherein the control parameters vary over N=2880 predefined time intervals (top) and N=1200 time intervals (bottom). In both cases after the 5th iteration, the diagrams partially overlap (and are not precisely distinguishable) due to the fact that all methods converge to the same objective.

The comparison of different optimisation algorithms is not fair unless all of them converge to the same optimal solution. This is demonstrated for all solvers in FIG. 6 for N=1200 and N=2880 where we see that all of them converge to the same objective value. The plots for all other cases are very similar and do not provide any further insights. The norms of the optimal solutions obtained with all solvers agree up to the optimality tolerance which was set to $10^{-5}$.

We observe that both IPOPT and MPFOPT have identical convergence histories. It worth noting that the objective, the infeasibility norm (not shown here), and the optimality norm for MPFOPT and IPOPT are indistinguishable. This is due to the fact that MPFOPT adopts a direct technique for solving the KIT system and, thus, it achieves a highly accurate solution similar to that obtained with direct sparse solvers like PARDISO.

Figure 11:
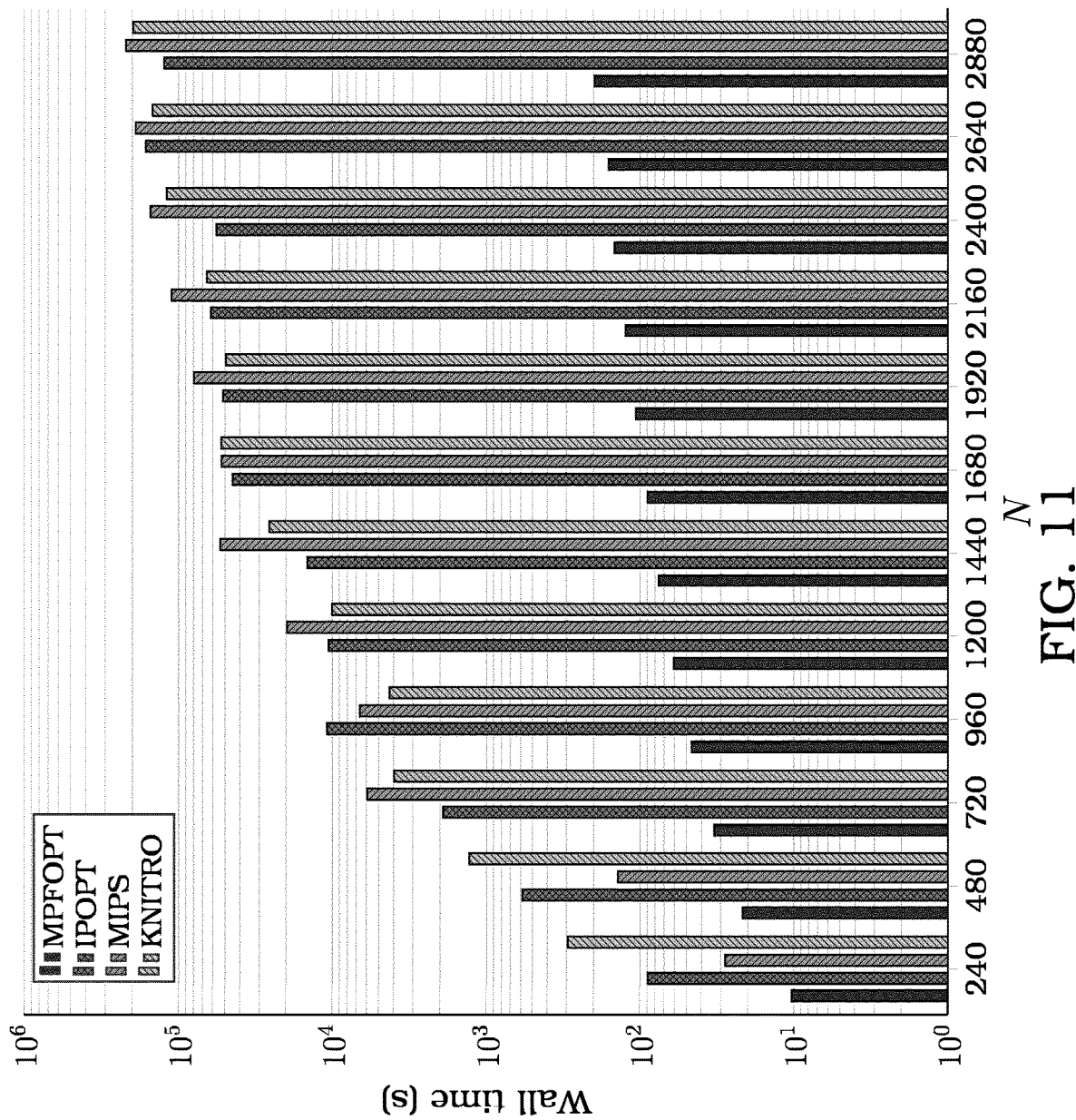
FIG. 11 is a diagram comparing the time to find the optimal power flow of the network according to the method of the present invention (MPFOPT) to the time to find the optimal solution according to three different prior art methods (MIPS, IPOPT, KNITRO), for different values N of predefined time intervals.

A collective comparison of the performance of all solvers is provided in FIG. 11, where the total time is shown in log scale needed by each one of the solvers, MPFOPT, IPOPT, MIPS, and KNITRO to optimize the case study IEEE118 for several values of the number of time periods from N=240 up to N=2880. It is evident that MPFOPT has a similar performance to the other solvers for a very small number of time periods. However, as the number of time periods increases MPFOPT outperforms all other solvers providing orders of magnitude faster solution times. We observe that the performance gap between MPFOPT and all other solvers increases with increasing values of N. For N=2880 MPFOPT requires approximately 0.4% of the time needed by the best competitor, which in this case is IPOPT.

The performance the method of the present invention, MPFOPT, to optimize the

TABLE 2

Case IEEE118. Wall time (s) spent for the solution of the KKT system, for function evaluations (objective, gradient, Jacobian, Hessian) and for all other operations of the MPFOPT algorithm.

Figure 12:
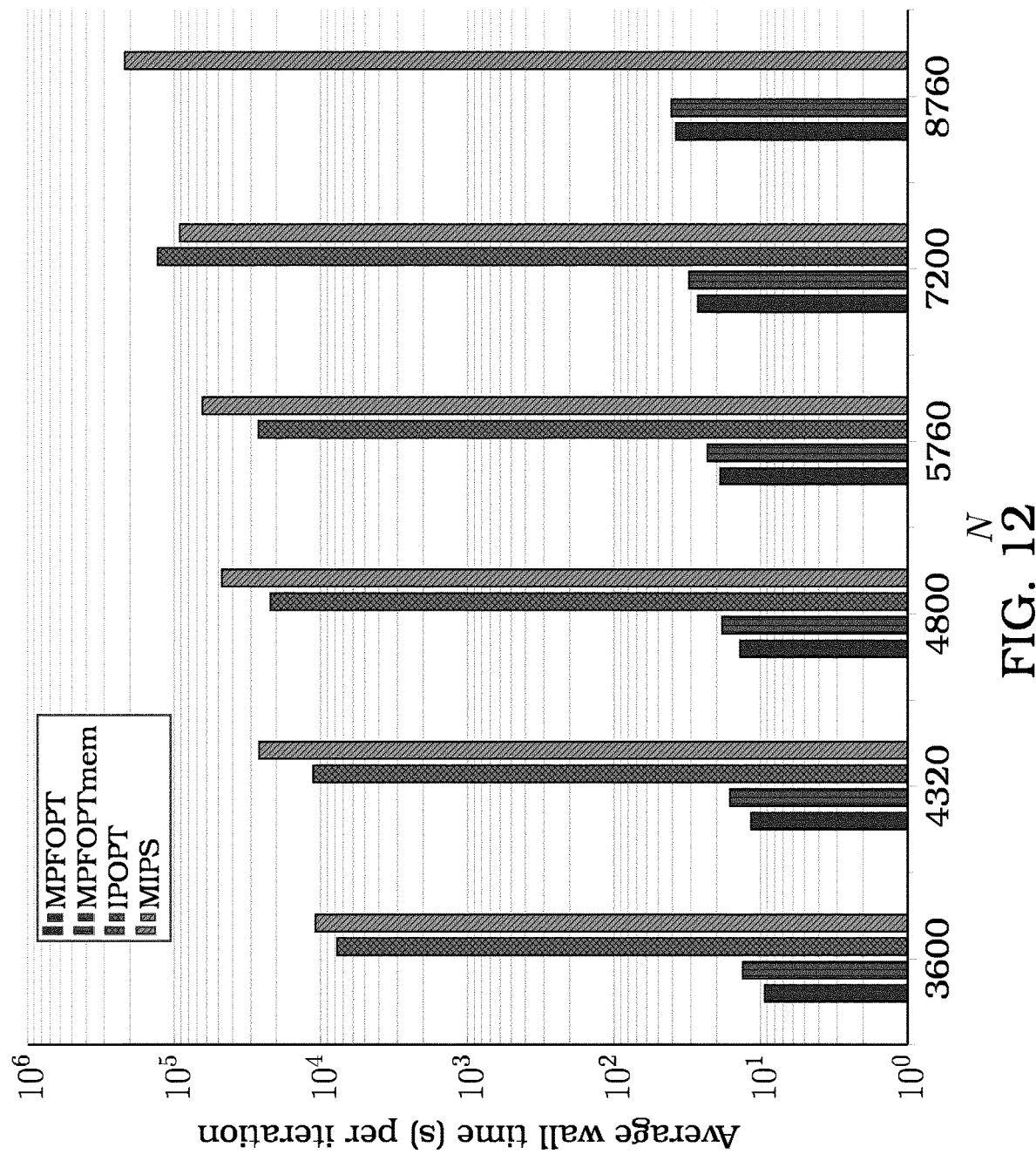
FIG. 12 is a diagram comparing the average time per iteration to find the optimal solution according to two embodiments of the present invention (MPFOPT, MPFOPT-mem) to the average time per iteration to find the optimal solution according to two different prior art methods (MIPS, IPOPT), for N=3600 up to N=8760 predefined time intervals.

| N | KKT rows | Iters. | KKT | Functions | MPFOPT | Average |
|---|---|---|---|---|---|---|
| 240 | 330738 | 24 | 14.3 | 16.4 | 3.2 | 0.4 |
| 480 | 661458 | 24 | 26.7 | 30.2 | 6.6 | 0.8 |
| 1200 | 1653618 | 23 | 66.3 | 82.7 | 22.7 | 2.2 |
| 1440 | 1984338 | 23 | 87.7 | 116.3 | 34.3 | 2.9 |
| 2400 | 3307218 | 23 | 159.9 | 205.2 | 74.7 | 5.4 |
| 2880 | 3968658 | 23 | 194.9 | 255.4 | 98.5 | 6.7 |
| 3600 | 4960818 | 23 | 265.9 | 360.5 | 150.9 | 9.3 |
| 4320 | 5952978 | 23 | 330.7 | 424.1 | 207.2 | 11.7 |
| 4800 | 6614418 | 23 | 395.2 | 501.5 | 260.1 | 13.9 |
| 5760 | 7937298 | 22 | 509.8 | 657.9 | 395 | 18.9 |
| 7200 | 9921618 | 23 | 738.3 | 1030.5 | 757.5 | 26.9 |
| 8760 | 12071298 | 23 | 1009.6 | 1515.6 | 1203.8 | 37.9 | case study IEEE118 beyond the previous range of time periods N, is shown for several values of N up to N=8760 in Table 2. The average time per iteration for N=3600 up to N=8760 corresponding to one year with a time step size corresponding to one hour, is shown in FIG. 12. For this set of benchmarks, KNITRO needed more than 1 TB of memory for N=3600 and it terminated with a related error message. For N=8760, IPOPT failed due to overflow of the number of nonzero entries in the L,U factors. It is worth noting that MPFOPTmem, the memory saving approach of MPFOPT that implements Alg. 6, although it is slightly slower than the normal mode of MPFOPT (Alg. 1, Alg. 2), it is still almost four orders of magnitude faster than all other approaches and needs approximately two orders of magnitude less memory than IPOPT. No upper bound on the relative speedup of MPFOPTmem versus the other solvers exists since the gap in performance grows with increasing values of N.

Figure 13:
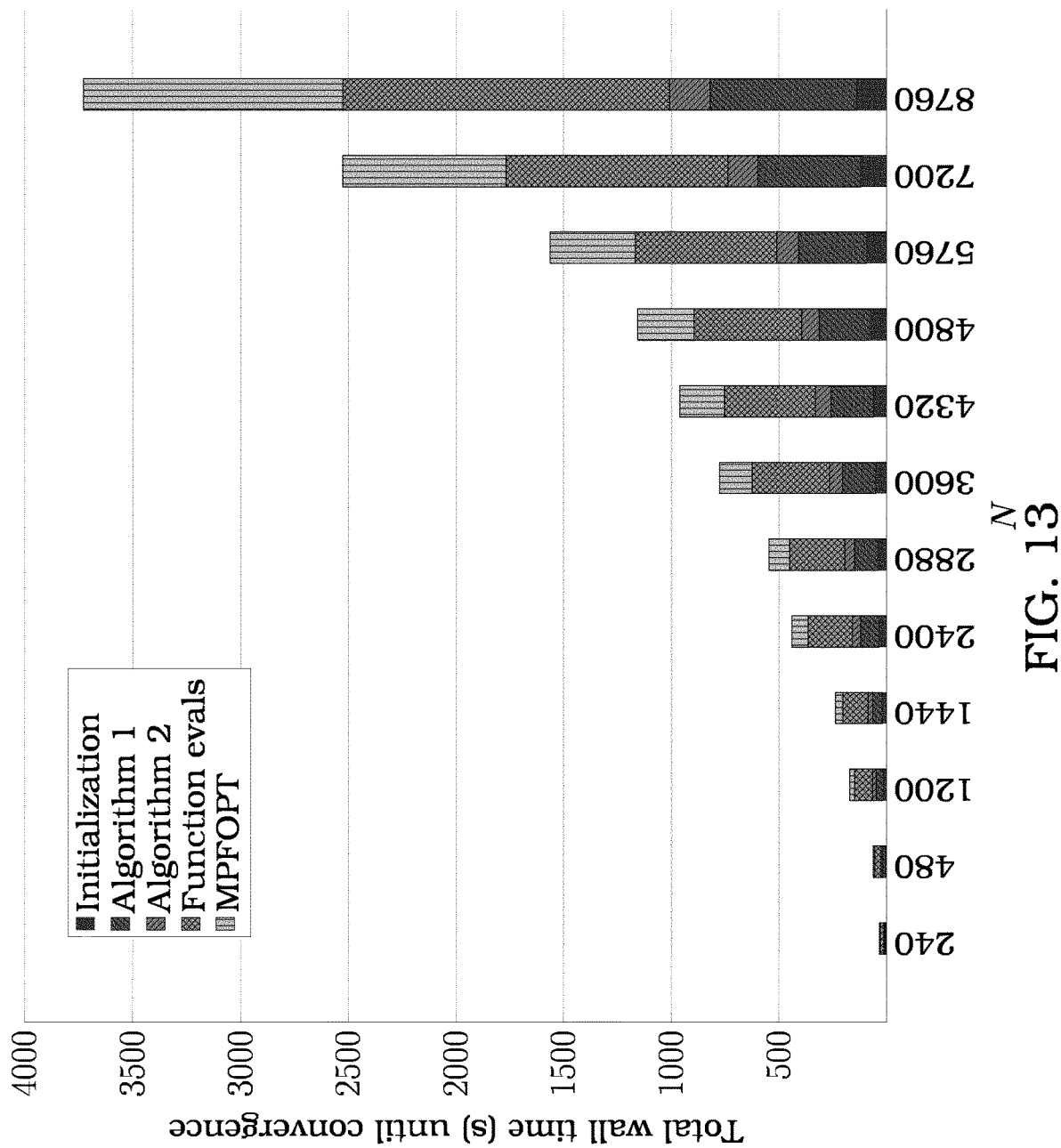
FIG. 13 is a diagram representing the time of different steps of the method of the present invention, for different values of N.

We present next the performance of different components of the MPFOPT algorithm in FIG. 13. We observe that the solution of the KKT system, which consists of Alg. 1 and Alg. 2 as well as the time spent for the initialisation, shares approximately one third of the total execution time. The rest of the time is spent in function evaluations, meaning the computation of the objective, the constraints, the Hessian of the Lagrangian, the Jacobian of the constraints, and internal operations of the MPFOPT algorithm.

TABLE 3

Figure 14:
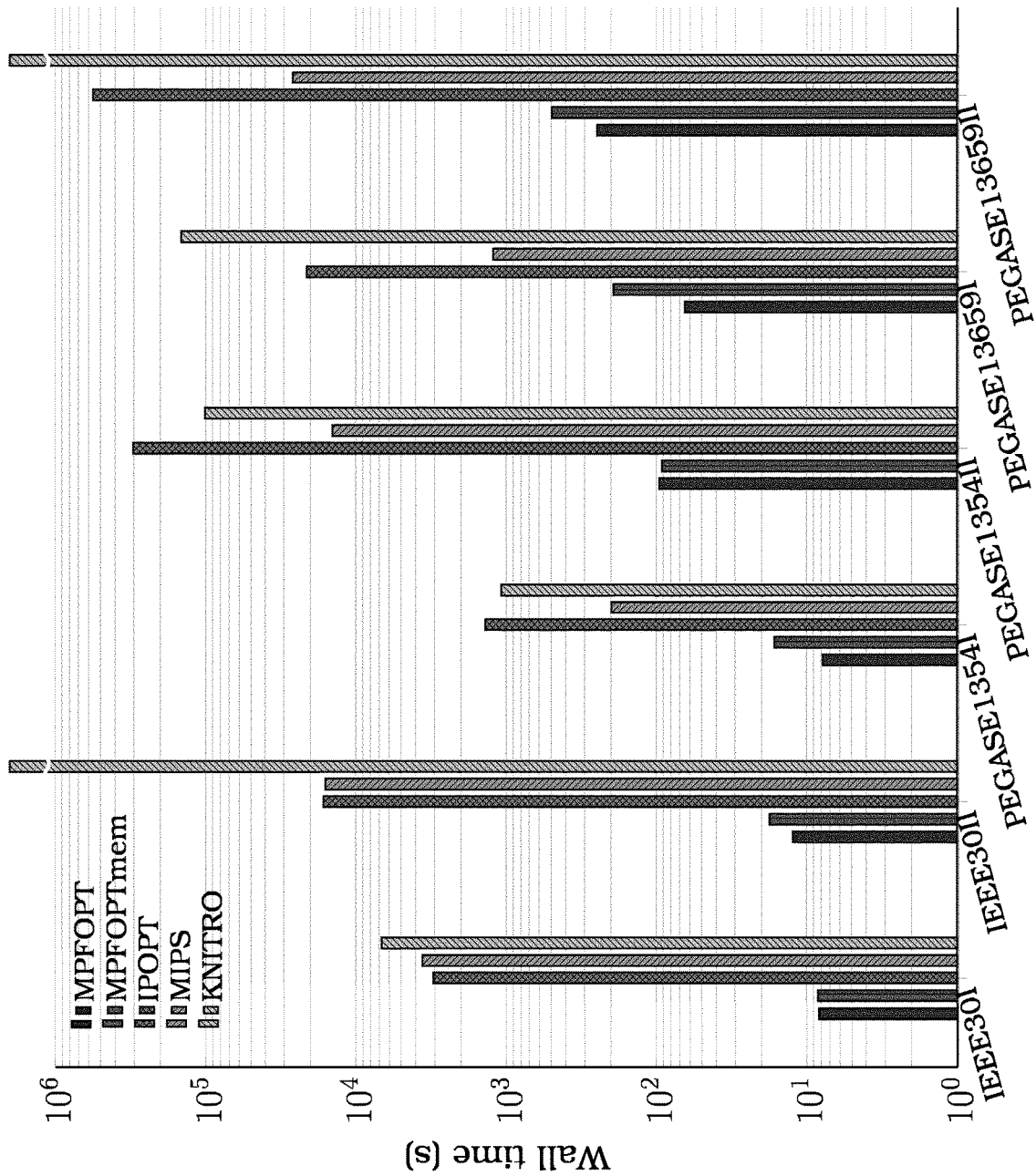
FIG. 14 is another diagram comparing the average time per iteration to find the optimal solution according to two embodiments of the present invention (MPFOPT, MPFOPT-mem) to the average time per iteration to find the optimal solution according to three different prior art methods (MIPS, IPOPT, KNITRO), for the solution of the benchmark cases listed in Table 3.

Benchmark cases for FIG. 14. The second column shows the value of the time period N for each case, and the third column the associated size of the KKT matrix.

| Name | N | nrows |
|---|---|---|
| IEEE30A | 2880 | 956172 |
| IEEE30B | 4800 | 1593612 |
| PEGASE1354A | 240 | 3408100 |
| PEGASE1354B | 1200 | 17040100 |
| PEGASE13659A | 240 | 34869320 |
| PEGASE13659B | 720 | 104607560 |

Finally we present in FIG. 14 the average time per iteration of all algorithms for the solution of the benchmark cases listed in Table 3. We have used two different values of N for each case. For case IEEE30 we used N=2880, N=4800, for PEGASE1354 N=240, N=1200, and for PEGASE13659 N=240, N=720. The interrupted green bar corresponding to KNITRO for case IEEE30 with N=4800 and case PEGASE13659, N=720 indicated that KNITRO needed more than 1 TB of RAM. Although the MIPS algorithm shows a similar performance to IPOPT for a small network like IEEE30 even for large values of N=2880, we see that the same thing is not true for the larger networks PEGASE1354, PEGASE13659, where MIPS is about one order of magnitude faster than IPOPT. However, both MPFOPT and MPFOPTmem algorithms still exceed every other competitor by orders of magnitude.

While the preferred embodiments of the invention have been shown and described, modifications and variations may be made by those skilled in the art without departing from the spirit and scope of the present invention. It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense. It is also to be understood that the following claims are intended to cover all of the generic and specific features of the invention herein described and all statements of the scope of the invention which, as a matter of language, might be said to fall therein.

The invention claimed is:

1. A method for optimizing the power flow in an electric power network, said electric power network including a plurality of buses interconnected by transmission lines, and locally connected to loads, generators, and storage devices, the method executes an interior point optimisation algorithm in a computer system to solve an optimal control problem defined over a time period of interest T, where an objective function associated with said optimal control problem represents a total fuel consumption of the generators for said time period of interest T,
said objective function depending on a plurality of parameters of said network, bus voltages, generator, and storage devices powers, said parameters of the network allowed to vary over a number N of predefined time intervals each of duration δt obtained by subdivisions of said time period of interest T, wherein said objective function is subject to constraints of said network, bus voltages, generator, and storage devices powers,
characterized by the fact that said interior point algorithm includes the steps of:
storing a KKT system associated with the optimality conditions for the Lagrangian associated with said objective function and said constraints defined for said time period T, the KKT system including a Hessian matrix H;
reordering the KKT system to obtain a reordered KKT system where the Hessian matrix H after the reordering has an arrowhead structure with diagonal blocks $A_n$, and off diagonal blocks $B_n$ comprising several identical copies of constant in time matrix B of charging and discharging ratios of said storages device which are:
executing a direct Schur complement based factorisation and solution algorithm on said reordered KKT system;
returning output parameters for said network, buses, loads, generators, and storages devices as a solution of said optimal control problem for each of said time intervals, wherein the time and memory required to achieve the solution to the optimal control problem is drastically reduced over general purpose NLP methods, due to exploitation in the calculations involved in said Schur complement algorithm of the repetition of constant in time block matrices B of charging and discharging ratios of the storage devices inside the off diagonal blocks Bn in the reorder KKT system.

2. Method according to claim 1 wherein said parameters include
a) $\mathcal{G}(\mathcal{B}, \mathcal{L})$, $N_G$, $N_L$, $N_S$: The graph, the number of generators, the number of transmission lines, and the number of storage devices.
b) $I_G$, $I_S$: The locations of generators, and the locations of storage devices.
c) $\alpha_l$, $\beta_l$, $\gamma_l$: The conductance and the susceptance of the line, as well as the shunt capacitance $\gamma_l$ of the line for $l \in \mathcal{L}$.
d) $d_b^P$, $d_b^Q$: Active and reactive power demand at bus $b \in \mathcal{B}$.
e) $f_l^{max}$: Thermal flow limit for every line $l \in \mathcal{L}$.
f) $V_b^{max}$, $V_b^{min}$: Maximum and minimum voltage level for each bus $b \in \mathcal{B}$.
g) $p_g^{max}$, $p_g^{min}$: Maximum and minimum active power levels for each generator $g \in \mathcal{G}$.
h) $q_g^{min}$, $q_g^{min}$: Maximum and minimum reactive power levels for each generator $g \in \mathcal{G}$.

i) $\mathcal{B}_t^{max}$, $\mathcal{B}_t^{min}$: Maximum and minimum tap ratio limits for transformer $t \in \mathcal{B}$.

j) $a_g$, $b_g$, $c_g$: Constant, linear, and quadratic term of the power generation cost function for generator $g \in \mathcal{G}$.

k) $\eta_{c,s}$, $\eta_{s,d}$: Charging and discharging ratios for each storage device $s \in S$.

3. Method according to claim 1, wherein said reordered KKT system is in the form $$\begin{bmatrix} A_1 & & & & B_1 \\ & A_2 & & & B_2 \\ & & \ddots & & \vdots \\ & & & A_N & B_N \\ B_1^\top & B_2^\top & \ldots & B_N^\top & C \end{bmatrix} \begin{bmatrix} x_1 \\ x_2 \\ \vdots \\ x_N \\ x_c \end{bmatrix} = \begin{bmatrix} b_1 \\ b_2 \\ \vdots \\ b_N \\ b_c \end{bmatrix}.$$

4. Method according to claim 1, wherein said Hessian matrix is in the form $$\begin{bmatrix} A_1 & & & & B_1 \\ & A_2 & & & B_2 \\ & & \ddots & & \vdots \\ & & & A_N & B_N \\ B_1^\top & B_2^\top & \ldots & B_N^\top & C \end{bmatrix},$$

$$A_n = \begin{bmatrix} H_n & J_{En}^\top & J_{In}^\top & 0 \\ J_{En} & 0 & 0 & 0 \\ J_{In} & 0 & 0 & -S_n \\ 0 & 0 & -S_n & \Lambda_{In} \end{bmatrix}.$$

5. Method according to claim 1, wherein said off diagonal blocks $B_n$, n=1, 2, ..., N, are in the form $$\begin{bmatrix} B_1 \\ B_2 \\ \vdots \\ B_n \\ \vdots \\ B_N \end{bmatrix} = \begin{bmatrix} 0 & B_1^1 & B & B & B & \ldots & B \\ 0 & B_2^1 & B_2^2 & B & B & \ldots & B \\ \vdots & \vdots & \vdots & \vdots & \vdots & \ddots & \vdots \\ 0 & B_n^1 & O & B_n^2 & B & \ldots & B \\ \vdots & \vdots & \vdots & \vdots & \vdots & \ddots & \vdots \\ 0 & B_N^1 & 0 & 0 & \ldots & 0 & B_N^2 \end{bmatrix}.$$

6. Method according to claim 1, wherein the Schur complement matrix at each time interval $S_n$ is in the form $$S_n = \begin{bmatrix} 0 & 0 & O & 0 & 0 & \ldots & 0 \\ 0 & S_{11} & O & S_{12} & S_{10} & \ldots & S_{10} \\ O & O & O & O & O & \ldots & O \\ 0 & S_{12}^\top & O & S_{22} & S_{20} & \ldots & S_{20} \\ 0 & S_{10}^\top & O & S_{20}^\top & S_{00} & \ldots & S_{00} \\ \vdots & \vdots & \vdots & \vdots & \vdots & \ddots & \vdots \\ 0 & S_{10}^\top & O & S_{20}^\top & S_{00}^\top & \ldots & S_{00} \end{bmatrix}_n,$$

and as such it can be represented by the independent of the number of time intervals N matrix $S_n^3$ incorporating the distinct blocks of $S_n$ $$S_n^3 = \begin{bmatrix} S_{11} & S_{12} & S_{10} \\ S_{12}^\top & S_{22} & S_{20} \\ S_{10}^\top & S_{20}^\top & S_{00} \end{bmatrix}.$$

7. Method according to claim 1, wherein the charging/discharging ratios of said storage devices are constant in time, and in the sparse Schur complements computed for each time interval by the interior point algorithm, only a small subset of block entries, independent on the number of time periods N are computed and stored in the structure of the local sparse Schur complement.

8. Method according to claim 1, wherein said Schur-complement-based algorithm computes and stores the global Schur complement using only 3 block vectors consisting of N dense blocks of size $N_S$ by $N_S$, where $N_S$ is the number of storage devices.

9. Method according to claim 1, wherein said Schur-complement-based algorithm uses a novel $LDL^T$ factorisation and back substitution of the dense global Schur complement using only three block vectors reducing the complexity of the standard $LDL^T$ algorithm from cubic to quadratic for the factorisation step and from quadratic to linear for the back substitution step, and the storage requirements of said computer system from $O(N_S^2 N^2)$ to $O(N_S^2 N)$.

10. Method according to claim 1, wherein the parameters for the optimizing include an admittance matrix based on a branch impedance and a bus fixed shunt admittance, and flow capacity ratings.

11. Method according to claim 1, where said output parameters comprise complex valued voltages, active and reactive power levels of generators, and energy storage device rate of charge.

12. Method according to claim 1, where said objective function depends on active power generation variables, reactive power generation variables, complex valued voltages.

13. Method according to claim 1, wherein the objective function is quadratic.

14. Method according to claim 1, where the objective function represents market surplus.

15. Method according to claim 1, where the objective function represents active transmission line losses.

16. Method according to claim 1, where equality constraints, inequality constraints, and bounds on decision variables are set to model limits of feasible operation of the network.

17. Method according to claim 1, further comprising modeling bounds on power generation, bounds on voltage magnitude at buses, bounds on rate of charge of batteries, bounds on state-of charge of batteries, and constraints on power transferred on lines.

18. Method according to claim 1, where the electric power network includes energy storage devices, and the multiple time periods are coupled to accommodate charging and discharging of the power storage devices at any particular time.

19. Method according to claim 1, where the multiple time periods of operation of the electric network are due to bounds on power generation, bounds on voltage magnitude at buses, bounds on rate of charge of batteries, bounds on state-of-charge of batteries, constraints on the power transferred on the lines and thermal losses.

20. Method according to claim 1, where the constraint $\epsilon_N = \epsilon_0$, defined to prevent depletion of the storages at the end of the dispatch horizon of time period T, is defined several times within the dispatch horizon of period T at the end of M subdivisions of duration $\Delta t$, $(\Delta t > \delta t)$ each.

* * * * *

UNITED STATES PATENT AND TRADEMARK OFFICE
CERTIFICATE OF CORRECTION

PATENT NO. : 11,080,362 B2
APPLICATION NO. : 16/498676
DATED : August 3, 2021
INVENTOR(S) : Drosos Kourounis and Olaf Schenk It is certified that error appears in the above-identified patent and that said Letters Patent is hereby corrected as shown below:

In the Specification

Column 16, Line 56:
"11: $r_c := S_c^{-1} r_c$"
Should read:
--11: $x_c := S_c^{-1} r_c$--

Column 18, Line 23:
"KIT"
Should read:
--KKT--

In the Claims

Column 21, Lines 1 and 2:
"i) $ß_t^{max}$, $ß_t^{min}$: Maximum and minimum tap ratio limits for transformer $t \in ß$."
Should read:
--i) $\tau_t^{max}$, $\tau_t^{min}$: Maximum and minimum tap ratio limits for transformer $t \in \tau$.--

Signed and Sealed this
Seventh Day of May, 2024

Katherine Kelly Vidal
*Director of the United States Patent and Trademark Office*